United States Patent
Lee et al.

(10) Patent No.: US 10,396,876 B2
(45) Date of Patent: Aug. 27, 2019

(54) PERIODIC CSI REPORTING METHOD PERFORMED BY TERMINAL IN WIRELESS COMMUNICATION SYSTEM AND TERMINAL USING THE METHOD

(71) Applicant: LG ELECTRONICS INC., Seoul (KR)

(72) Inventors: Seungmin Lee, Seoul (KR); Suckchel Yang, Seoul (KR); Daesung Hwang, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/752,077

(22) PCT Filed: Aug. 16, 2016

(86) PCT No.: PCT/KR2016/008993
§ 371 (c)(1),
(2) Date: Feb. 12, 2018

(87) PCT Pub. No.: WO2017/026877
PCT Pub. Date: Feb. 16, 2017

(65) Prior Publication Data
US 2018/0241453 A1  Aug. 23, 2018

Related U.S. Application Data

(60) Provisional application No. 62/204,951, filed on Aug. 13, 2015, provisional application No. 62/232,428, (Continued)

(51) Int. Cl.
*H04B 7/06* (2006.01)
*H04W 76/20* (2018.01)
(Continued)

(52) U.S. Cl.
CPC ............ *H04B 7/0626* (2013.01); *H04L 1/06* (2013.01); *H04L 1/18* (2013.01); *H04L 1/1812* (2013.01);
(Continued)

(58) Field of Classification Search
CPC ..... H04B 7/0626; H04L 5/0057; H04L 5/001; H04L 5/0055; H04L 1/1812; H04L 1/18; H04L 1/06; H04W 72/0413; H04W 76/20
See application file for complete search history.

(56) References Cited

U.S. PATENT DOCUMENTS

2014/0362792 A1* 12/2014 Cheng ............... H04L 1/0029
370/329

OTHER PUBLICATIONS

NTT Docomo, Inc., "Views on CSI Enhancements to Rel.13 CA," R1-153195, 3GPP TSG RAN WG1 Meeting #81, Fukuoka, Japan, May 16, 2015, see section 2.
(Continued)

*Primary Examiner* — Dady Chery
(74) *Attorney, Agent, or Firm* — Dentons US LLP

(57) ABSTRACT

The present invention relates to a periodic channel state information (CSI) reporting method performed by a terminal in a wireless communication system, and provides a method comprising: determining whether to select a first physical uplink control channel (PUCCH) format; and if the first PUCCH format is selected, transmitting, on the basis of the first PUCCH format, a periodic CSI report and a hybrid automatic repeat request (HARQ) ACK, wherein the first PUCCH format is a PUCCH format supporting multiple periodic CSI reports.

10 Claims, 17 Drawing Sheets

Related U.S. Application Data filed on Sep. 24, 2015, provisional application No. 62/251,666, filed on Nov. 5, 2015.

(51) Int. Cl.
  *H04L 1/06* (2006.01)
  *H04L 1/18* (2006.01)
  *H04L 5/00* (2006.01)
  *H04W 72/04* (2009.01)

(52) U.S. Cl.
  CPC ............ *H04L 5/001* (2013.01); *H04L 5/0055* (2013.01); *H04L 5/0057* (2013.01); *H04W 72/0413* (2013.01); *H04W 76/20* (2018.02)

(56) References Cited

OTHER PUBLICATIONS

Huawei, Hisilicon, "HARQ-ACK Codebook Size Determination and Fallback Operation for up to 32 Component Cariers,", R1-152463, 3GPP TSG RAN WG1 Meeting #81, Fukuoka, Japan, May 16, 2015, see sections 2, 3.

ZTE, "CSI Enhancement for CA with up to 32 CCs," R1-153340, 3GPP TSG RAN WG1 Meeting #81, Fukuoka, Japan, May 16, 2015, see section 2.

Huawei, Hisilicon, "Enhancements to CSI Feedback for CA beyond 5 Carriers," R1-152464, 3GPP TSG RAN WG1 Meeting #81, Fukuoka, Japan, May 16, 2015, see section 2.

LG Electronics Inc., "CSI Feedback Enhancement for Rel-13 CA," R1-152720, 3GPP TSG RAN WG1, Meeting #81, Fukuoka, Japan, May 16, 2015, see section 2.

3GPP TS 36.211 V8.5.0, Dec. 2008.

* cited by examiner

US 10,396,876 B2

PERIODIC CSI REPORTING METHOD PERFORMED BY TERMINAL IN WIRELESS COMMUNICATION SYSTEM AND TERMINAL USING THE METHOD

CROSS-REFERENCE TO RELATED APPLICATIONS

This application is the National Stage filing under 35 U.S.C. 371 of International Application No. PCT/KR2016/008993, filed on Aug. 16, 2016, which claims the benefit of U.S. Provisional Applications No. 62/204,951 filed on Aug. 13, 2015, No. 62/232,428 filed on Sep. 24, 2015, and No. 62/251,666 filed on Nov. 5, 2015, the contents of which are all hereby incorporated by reference herein in their entirety.

BACKGROUND OF THE INVENTION

Field of the Invention

The present invention relates to wireless communication, and more particularly, to a periodic channel state information (CSI) reporting method performed by a terminal in a wireless communication system and a terminal using the method.

Related Art

The International Telecommunication Union Radio Communication Sector (ITU-R) is conducting a standardization operation of International Mobile Telecommunication (IMT)-Advanced which is a next-generation mobile communication system after 3rd generation. The IMT-Advanced aims to support IP (Internet Protocol) based multimedia service at data rate of 1 Gbps in stationary and low-speed moving states and 100 Mbps in a high-speed moving state.

The 3rd Generation Partnership Project (3GPP) as a system standard that meets the requirements of the IMT-Advanced prepares for LTE-Advanced (LTE-A) created by improving Long Term Evolution (LTE) based on Orthogonal Frequency Division Multiple Access (OFDMA)/Single Carrier-Frequency Division Multiple Access (SC-FDMA). The LTE-A is one of the strong candidates for the IMT-Advanced.

An LTE-A system adopts carrier aggregation (CA) and in this case, the carrier aggregation means aggregating multiple component carriers (CCs) and receiving and transmitting the aggregated component carriers (CCs). The component carriers may be divided into a primary component carrier (PCC) and a secondary component carrier (SCC). The primary component carrier (PCC) may be referred to as a primary cell (Pcell). In addition, other component carriers other than one primary component carrier (PCC) may be defined as the secondary component carrier (SCC), the secondary component carrier may be referred to as a secondary cell (SCell), and a UE may perform uplink transmission through the secondary cell.

As described above, a plurality of secondary cells may be configured for one primary cell. In this case, when a large number of cells are configured in one primary cell (i.e., a cell having a reference value (predetermined value) or more is configured in one primary cell), since information on a large number of secondary cells needs to be by using only a PUCCH and/or PUSCH of one primary cell, there may be a problem in that a payload of information on the secondary cell transmitted to a base station is excessively increased.

For example, assuming that 32 primary cells are configured in one primary cell, a terminal may need to transmit information of 32 secondary cells using only the PUCCH of the primary cell, and as a result, the payload of the information on the secondary cell transmitted in the primary cell may be excessively increased.

Accordingly, the present invention intends to provide a method for efficiently transmitting information related to a plurality of cells to the base station when a large number of cells are configured as a carrier aggregation technique.

SUMMARY OF THE INVENTION

The present invention provides a periodic channel state information reporting method performed by a terminal in a wireless communication system and a terminal using the method.

In an aspect, a method for periodic channel state information (CSI) reporting in a wireless communication system is provided. The method is performed by a user equipment (UE) and comprises determining whether to select a first physical uplink control channel (PUCCH) format, and if the first PUCCH format is selected, transmitting, on the basis of the first PUCCH format, a periodic CSI report and a hybrid automatic repeat request (HARQ) ACK. The first PUCCH format may be a PUCCH format supporting multiple periodic CSI reports.

In the determining of whether to select the first PUCCH format, when a larger number of cells than a predetermined threshold are configured in the UE by carrier aggregation, the first PUCCH format may be selected.

In the determining of whether to select the first PUCCH format, when a bit size of the periodic CSI report is larger than a predetermined threshold, the first PUCCH format may be selected.

In the determining of whether to select the first PUCCH format, when HARQ ACK fallback occurs, it may be determined whether to select the first PUCCH format.

When the bit size of the periodic CSI report is larger than the predetermined threshold, the first PUCCH format may be selected.

In the determining of whether to select the first PUCCH format, whether to select the first PUCCH format may be determined based on a bit of an HARQ ACK.

The method may further comprises determining a periodic CSI report target to be transmitted based on a CSI priority. The periodic CSI report and the HARQ ACK determined based on the first PUCCH format may be transmitted.

In another aspect, a method for periodic channel state information (CSI) reporting in a wireless communication system is provided. The method may be performed by a user equipment (UE) and comprise if both a hybrid automatic repeat request (HARQ) ACK and a periodic CSI report are configured to be transmitted, determining a periodic CSI report target to be transmitted based on a CSI priority and transmitting the determined periodic CSI report and HARQ ACK.

The CSI priority may be determined based on at least one cell group index, periodic CSI report type, CSI process index, cell index, or CSI subframe set index.

Bundling may be applied to the HARQ ACK.

When the number of periodic CSI reports which may be reported together with the HARQ ACK after bundling is larger than the number of periodic CSI reports which may be reported together with the HARQ ACK before bundling, the bundling may be applied to the HARQ ACK.

In other aspects, a user equipment (UE) is provided. The UE may comprise a radio frequency (RF) unit transmitting and receiving a radio signal and a processor operated in association with the RF unit. The processor may determine whether to select a first physical uplink control channel (PUCCH) format, and if the first PUCCH format is selected, transmit, on the basis of the first PUCCH format, a periodic CSI report and a hybrid automatic repeat request (HARQ) ACK. The first PUCCH format may be a PUCCH format supporting multiple periodic CSI reports.

According to an embodiment of the present invention, provided are a periodic channel state information reporting method performed by a terminal in a wireless communication system and a terminal using the method.

According to another embodiment of the present invention, since a terminal can configure carrier aggregation for a large number of cells, a large amount of data can be transmitted/received.

According to yet another embodiment of the present invention, information related to a plurality of cells can be efficiently transmitted to a base station when a large number of cells are configured as a carrier aggregation technique. More specifically, the terminal selects a PUCCH format (hereinafter, referred to as PF) (or 'FORMAT ADAPTION') and thereafter, transmits CSI report and HARQ ACK to the base station based on the selected PF to report multiple CSI reports and HARQ ACKs to the base station. Further, the terminal according to the present invention can transmit the CSI report and the HARQ ACK to the base station based on a priority of the CSI, so that the CSI report having a high priority can be appropriately transmitted by transmitting the CSI report having the high priority.

DESCRIPTION OF EXEMPLARY EMBODIMENTS

Figure 1:
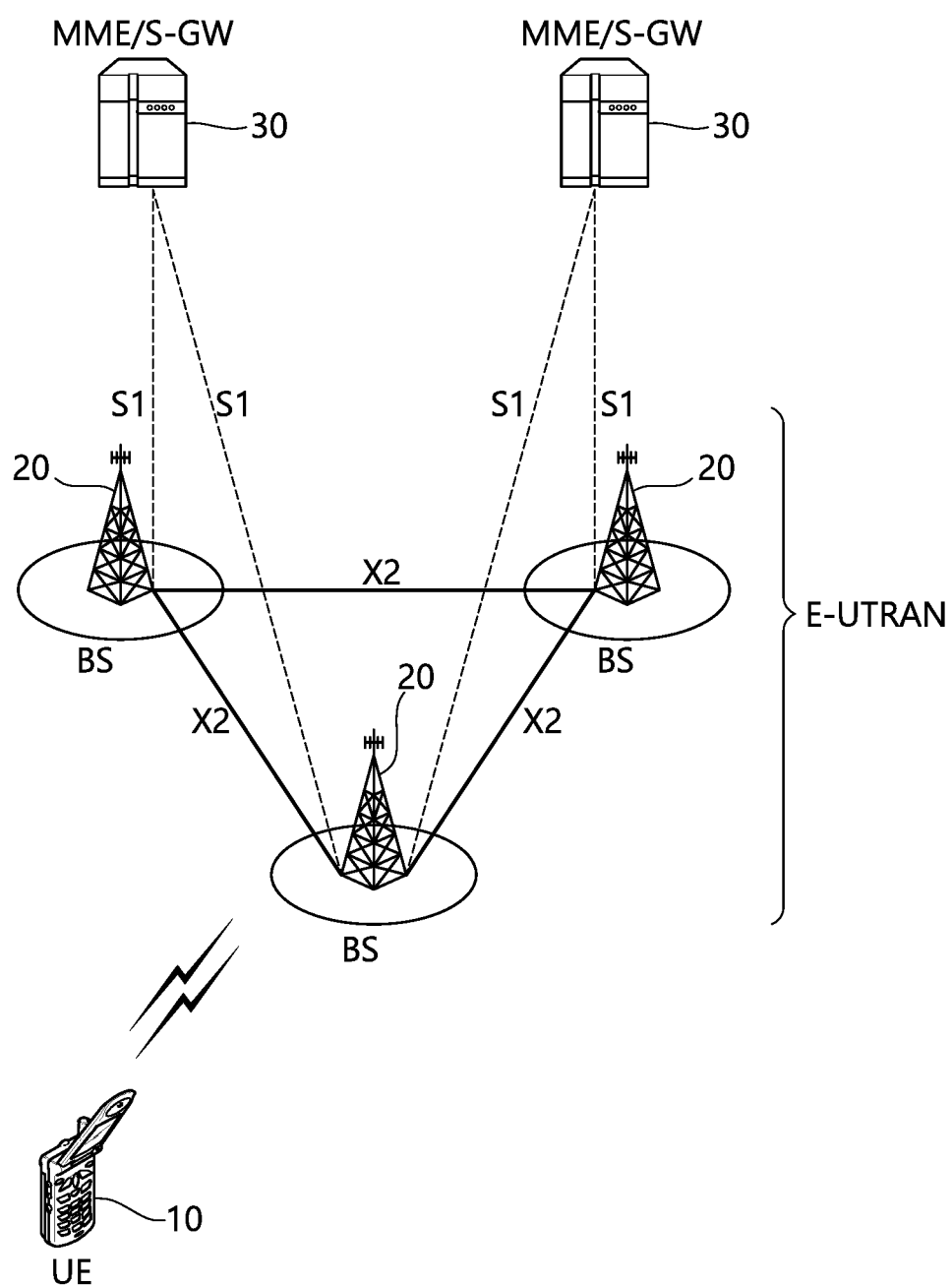
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
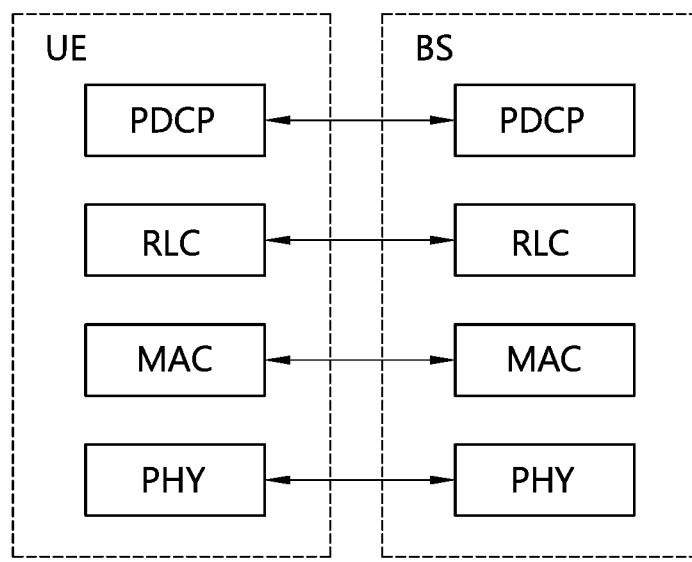
FIG. 2 is a diagram showing a wireless protocol architecture for a user plane.
Figure 3:
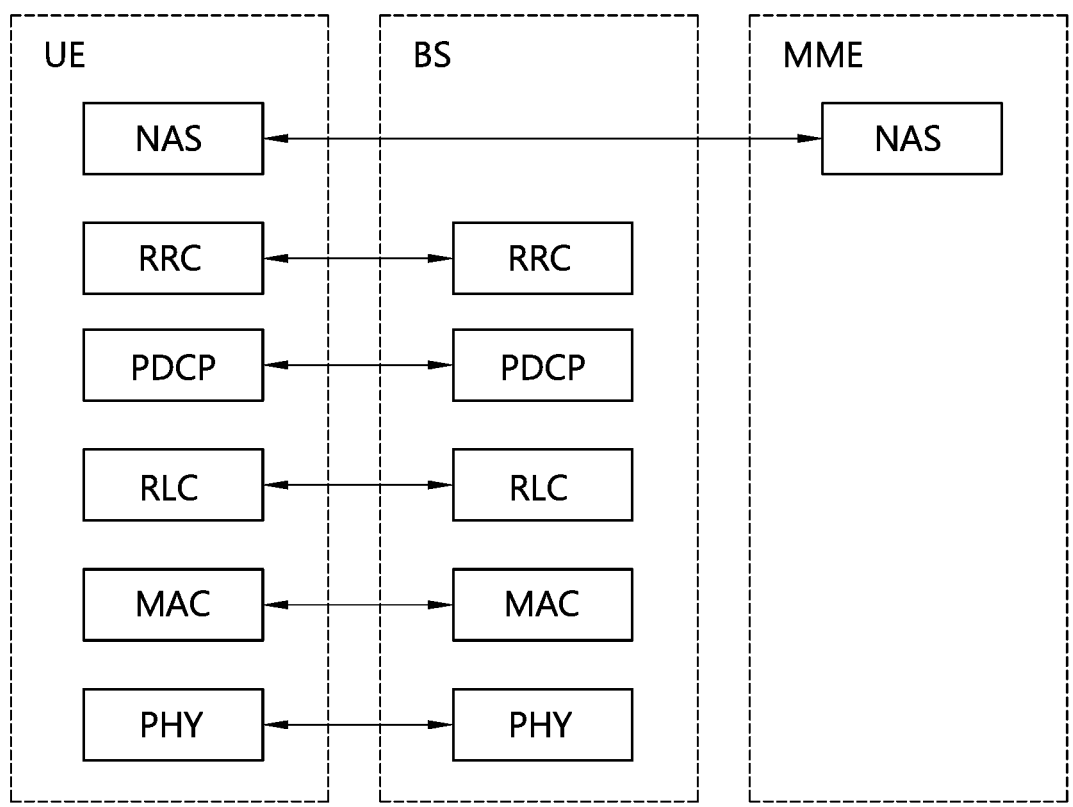
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
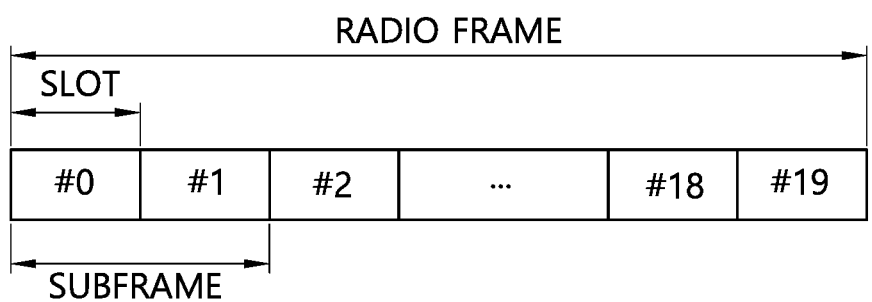
FIG. 4 illustrates a radio frame structure of 3GPP LTE.

FIG. 4 illustrates a radio frame structure of 3GPP LTE.

Referring to FIG. 4, a radio frame is constituted by 10 subframes and one subframe is constituted by two slots. As one example, a length of one subframe may be 1 ms and the length of one slot may be 0.5 ms. A time required for transmitting one subframe is referred to as a transmission time interval (TTI). The TTI may be a minimum unit of scheduling. The structure of the radio frame is merely an example and the number of subframes included in the radio frame and the number of slots included in the subframe may be variously changed.

Figure 5:
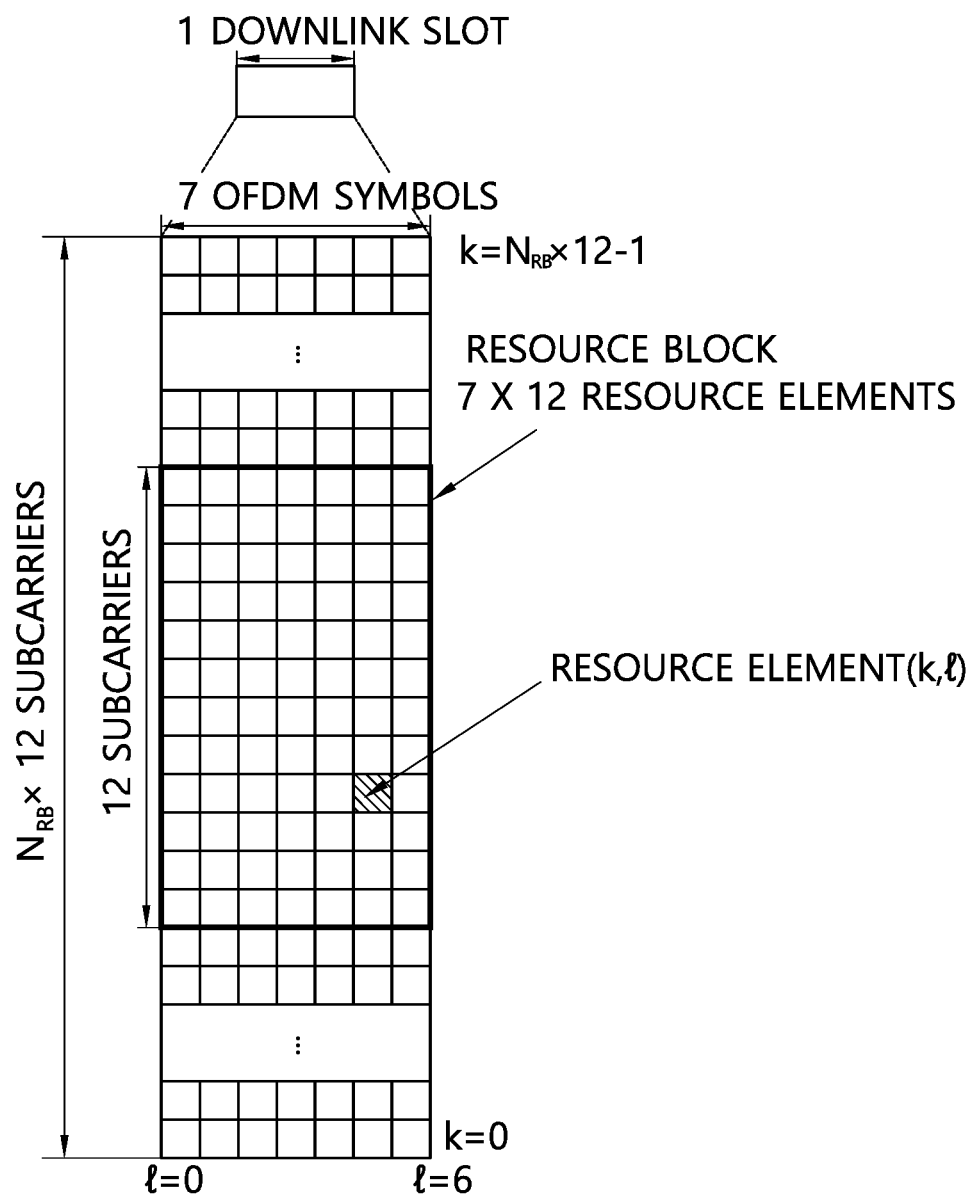
FIG. 5 is an exemplary diagram illustrating a resource grid for one downlink slot.

FIG. 5 is an exemplary diagram illustrating a resource grid for one downlink slot.

One slot in the radio frame includes a plurality of orthogonal frequency division multiplexing (OFDM) symbols in a time domain. The OFDM symbol is used to represent one symbol period because 3GPP LTE uses OFDMA in a downlink and may be referred to as another name depending on a multiple access scheme. For example, when SC-FDMA is used, the OFDM symbol may be referred to as an SC-FDMA symbol. It is exemplarily described that one slot includes 7 OFDM symbols, but the number of OFDM symbols included in one slot may be changed according to the length of a cyclic prefix (CP). According to 3GPP TS 36.211 V8.5.0 (2008-12), one subframe in a normal CP includes 7 OFDM symbols and one subframe in an extended CP includes 6 OFDM symbols.

In addition, one slot includes a plurality of resource blocks (RBs) in a frequency domain. A resource block includes a plurality of consecutive subcarriers in one slot as a resource allocation unit. In the resource block, the subcarrier may have an interval of 15 KHz, for example.

Each element on the resource grid is referred to as a resource element (RE) and one resource block includes 12×7 resource elements. The number of resource blocks, $N_{DL}$ included in a downlink slot depends on a downlink transmission bandwidth set in a cell. The resource grid described in FIG. 5 may be applied even in an uplink.

Figure 6:
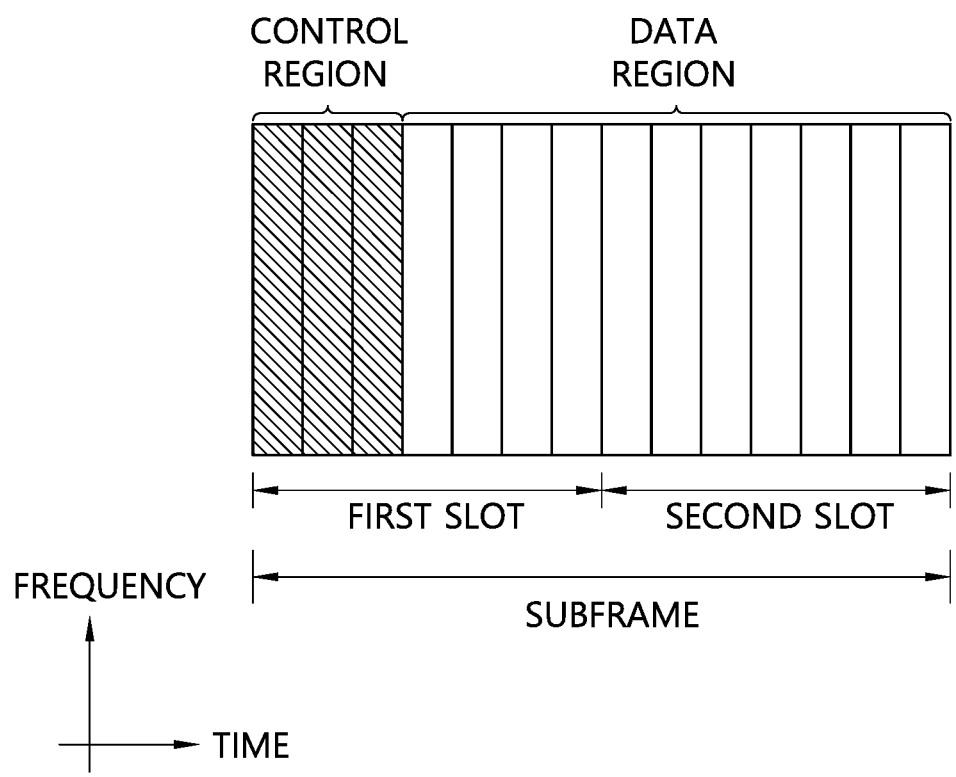
FIG. 6 illustrates a structure of a downlink subframe.

FIG. 6 illustrates a structure of a downlink subframe.

Referring to FIG. 6, the subframe includes two consecutive slots. A former maximum of 3 OFDM symbols of a first slot in the subframe are control regions to which control channels are allocated and the remaining OFDM symbols are data regions to which a data channel is allocated. The control region may be constituted by a maximum of 4 OFDM symbols according to a system band.

The control channels allocated to the control region include a physical control format indication channel (PCFICH), a physical hybrid-ARQ indicator channel (PHICH), and a physical downlink control channel (PDCCH). The PCFICH is a control channel through which information indicating the size of the control region, that is, the number of OFDM symbols constituting the control region is transmitted. The PHICH is a control channel for carrying acknowledgment/not-acknowledgment (ACK/NACK) for uplink data transmission of the UE. The PDCCH may carry resource allocation (also referred to as a downlink (DL) grant) and a transmission format of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. Control information transmitted through the PDCCH is referred to as downlink control information (DCI).

DCI formats include format 1 for physical uplink shared channel (PUSCH) scheduling, format 1 for scheduling one PDSCH codeword, format 1A for compact scheduling of one PDSCH codeword, format 1B for compact scheduling for rank-1 transmission of a single codeword in a spatial multiplexing mode, format 1C for very compact scheduling of the downlink shared channel (DL-SCH), format 1D for PDSCH scheduling in a multi-user spatial multiplexing mode, format 2 for PDSCH scheduling in a closed-loop spatial multiplexing mode, format 2A for PDSCH scheduling in an open-loop spatial multiplexing mode, format 3 for transmitting a 2-bit power control transmission power control TPC) command for the PUCCH and the PUSCH, and format 3A transmitting a 1-bit power control TPC command of the PUCCH and the PUSCH.

Figure 7:
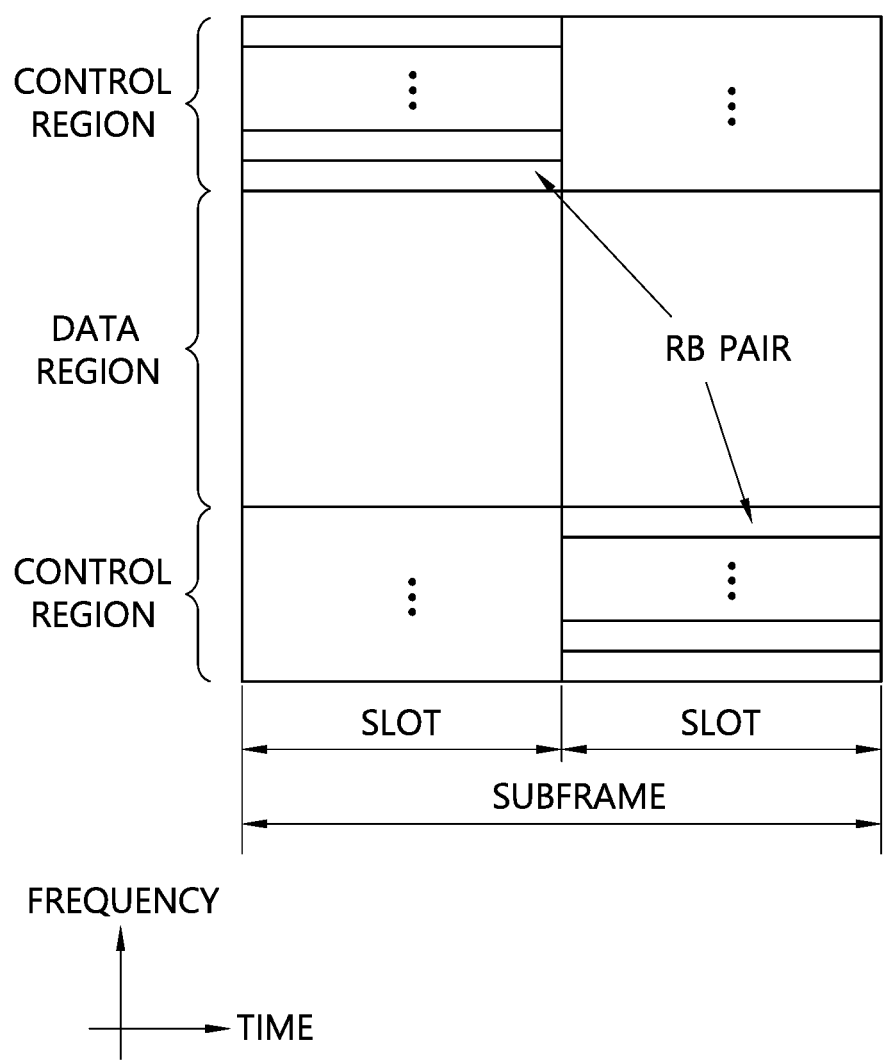
FIG. 7 illustrates the structure of an uplink subframe.

FIG. 7 illustrates the structure of an uplink subframe.

Referring to FIG. 7, the uplink subframe may be divided into a control region to which the physical uplink control channel (PUCCH) for carrying uplink control information is allocated and a data region to which the physical uplink shared channel (PUSCH) for carrying user data is allocated in a frequency domain.

The PUCCH for one UE is allocated to a pair of resource blocks (RBs) and the RBs which belong to the pair of RBs occupy different subcarriers in two slots, respectively. In this case, the pair of RBs allocated to the PUCCH frequency-hop in a slot boundary.

Hereinafter, a carrier aggregation (CA) system will be described.

An LTE-A system adopts carrier aggregation (CA) and in this case, the carrier aggregation means aggregating multiple component carriers (CCs) and receiving and transmitting the aggregated component carriers (CCs). Through the carrier aggregation, the LTE system enhances a transmission bandwidth of the UE and increases use efficiency of the frequency.

The component carriers may be divided into a primary component carrier (PCC) and a secondary component carrier (SCC). The primary component carrier (PCC) is a component carrier that becomes the center of management of the component carrier when using multiple component carriers and one primary component carrier (PCC0 is defined for each UE. The primary component carrier (PCC) may be referred to as a primary cell (Pcell).

In addition, other component carriers other than one primary component carrier (PCC) may be defined as the secondary component carrier (SCC), the secondary component carrier may be referred to as a secondary cell (SCell), and a UE may perform uplink transmission through the secondary cell.

Figure 8:
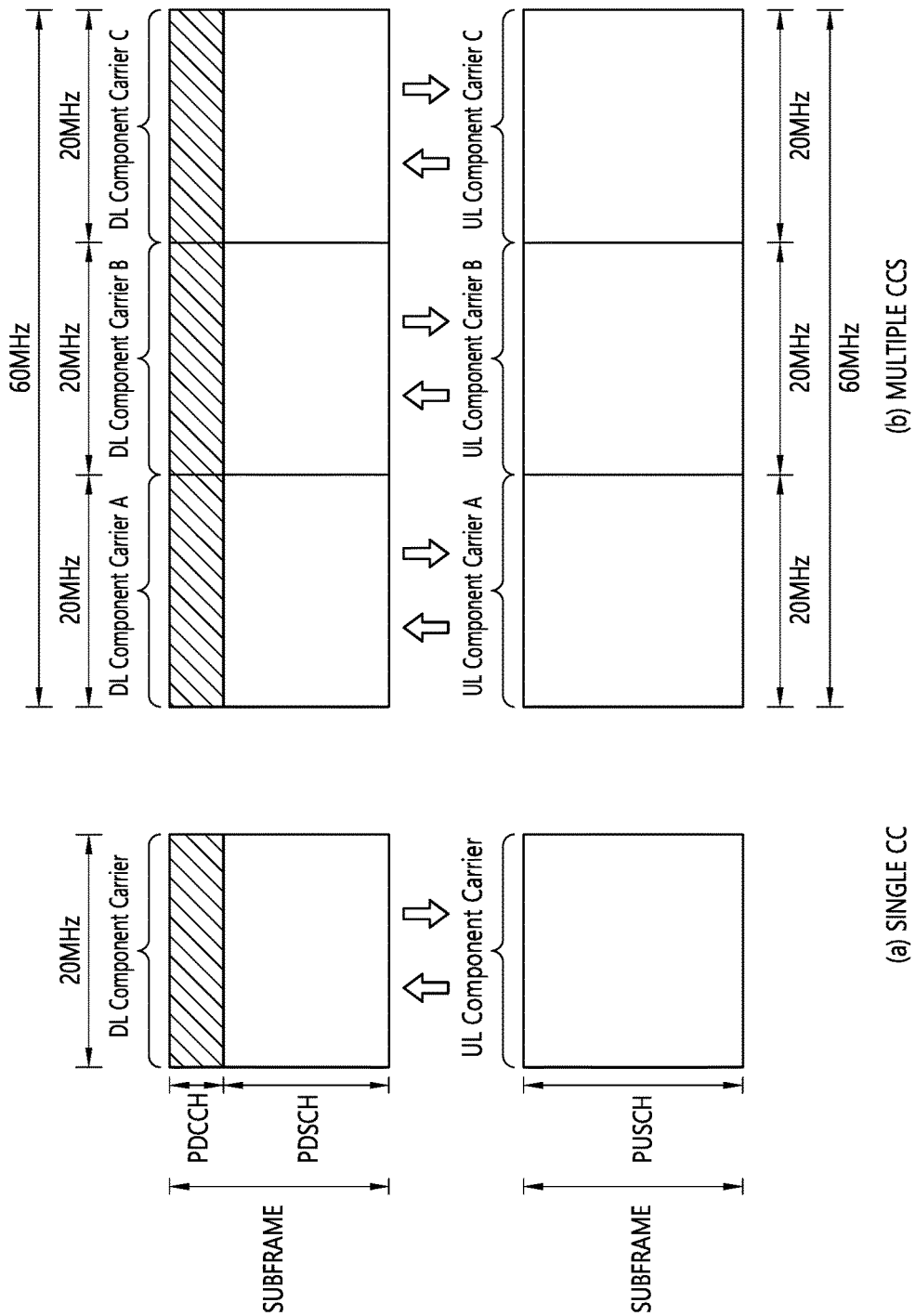
FIG. 8 illustrates a comparative example of a single carrier system and a carrier aggregation system.

FIG. 8 illustrates a comparative example of a single carrier system and a carrier aggregation system.

Referring to FIG. 8, in the single carrier system, only one carrier is supported to a UE in an uplink and a downlink. A bandwidth of the carrier may vary, but one carrier is allocated to the UE. On the contrary, in the carrier aggregation (CA) system, a plurality of element carriers (DL CCs A to C and UL CCs A to C) may be allocated to the UE. For example, three 20 MHz element carriers may be allocated in order to allocate a bandwidth of 60 MHz to the UE.

The carrier aggregation system may be classified into a contiguous carrier aggregation system in which respective carriers are continuous and a non-contiguous carrier aggregation system in which the respective carriers are separated from each other. Hereinafter, when the carrier aggregation system is simply referred to as the carrier aggregation system, it should be understood that the carrier aggregation system includes both cases where the element carriers are continuous and discontinuous.

Element carriers targeted when one or more element carriers are aggregated may just use the bandwidth used in the existing system for backward compatibility with the existing system. For example, in a 3GPP LTE system, bandwidths of 1.4 MHz, 3 MHz, 5 MHz, 10 MHz, 15 MHz, and 20 MHz may be supported and in a 3GPP LTE-A system, a wideband of 20 MHz or more may be configured by using only the bandwidths of the 3GPP LTE system. Alternatively, the wideband may be configured by defining a new bandwidth without using the bandwidth of the existing system.

A system frequency band of the wireless communication system is divided into a plurality of carrier frequencies. Here, the carrier frequency means a center frequency of a cell. Hereinafter, the cell may be constituted by a pair of a downlink frequency resource and an uplink frequency resource. Alternatively, the cell may be constituted only by the downlink frequency resource. In general, in a case where the carrier aggregation (CA) is not considered, the uplink and downlink frequency resources may continuously exist as a pair in one cell.

In order to transmit and receive packet data through a specific cell, the UE needs to first complete a configuration for the specific cell. Here, the configuration means a state in which system information reception required for data transmission to and reception from the corresponding cell is completed. For example, the configuration may include an overall process of receiving common physical layer parameters required for data transmission and reception, MAC layer parameters, or parameters required for a specific operation in an RRC layer. The configuration-completed cell is in a state in which packets are enabled to be immediately transmitted and received when only information that the packet data may be transmitted.

The cell in the configuration completed state may exist in an activation state or a deactivation state. Herein, activation means that data transmission or reception is performed or the cell is in a ready state. The UE can monitor or receive a control channel (PDCCH) and a data channel (PDSCH) of the activated cell in order to check resources (frequency, time, etc.) allocated to the UE.

Deactivation means that transmission or reception of traffic data is impossible and measurement or transmission/reception of minimum information is possible. The UE may receive system information (SI) required for receiving the packet from the deactivated cell. On the contrary, the UE may not monitor or receive the control channel (PDCCH) and the data channel (PDSCH) of the deactivated cell in order to check the resources (frequency, time, etc.) allocated thereto.

The cell may be divided into a primary cell (Pcell), a secondary cell (Scell), and a serving cell.

When the carrier aggregation is configured, the UE has only one RRC connection with a network. In an RRC connection establishment/re-establishment/handover process, one cell provides non-access stratum (NAS) mobility information and a security input. Such a cell is referred to as the primary cell. In other words, the primary cell means a cell in which the UE performs an initial connection establishment procedure or a connection reestablishment procedure with the base station or a cell indicated as the primary cell during the handover procedure.

The secondary cell is a cell that is configured to provide additional radio resources once the RRC connection through the primary cell is established.

The serving cell refers to a cell that is configured to provide services to the UE and a UE in which the carrier aggregation is not configured or the carrier aggregation may not be provided is configured by the primary cell. When the carrier aggregation is configured, the serving cell may be constituted by a plurality of serving cells. The plurality of serving cells may be constituted by the primary cell and one or a plurality of sets among all secondary cells.

A primary component carrier (PCC) means a CC corresponding to the primary cell. The PCC is a CC in which the UE initially establishes connection (RRC connection) with the base station among several CCs. The PCC is a special CC for taking charge of connections (connection or RRC connection) for signaling with respect to the several CCs and managing UE context information, which is connection information related to the UE. In addition, the PCC is connected to the UE and continuously exists in an active state when an RRC connected mode is established. A downlink component carrier corresponding to the primary cell is called a downlink primary component carrier (DL PCC) and an uplink component carrier corresponding to the primary cell is called an uplink primary component carrier (UL PCC).

The secondary component carrier (SCC) means a CC corresponding to the secondary cell. That is, the SCC is a CC allocated to the UE in addition to the PCC and the SCC may be an extended carrier extended for additional resource allocation in addition to the PCC, and may be divided into the activated state or the deactivated state. The downlink component carrier corresponding to the secondary cell is referred to as a downlink secondary CC (DL SCC) and the uplink component carrier corresponding to the secondary cell is referred to as an uplink secondary component carrier (UL SCC).

The component carrier constituting the serving cell may constitute one serving cell of the downlink component carrier and the downlink component carrier and the uplink component carrier are connected and configured to constitute one serving cell. In the related art, the serving cell is not constituted by only one uplink component carrier. However, in the present invention, the serving cell may be constituted by only the uplink component carrier.

That is, activation/deactivation of the component carrier is equivalent to a concept of the activation/deactivation of the serving cell. For example, assuming that serving cell 1 is constituted by DL CC 1, activation of serving cell 1 means implies activation of DL CC 1. Assuming that serving cell 2 is constituted by connecting and configuring DL CC2 and UL CC2, activation of serving cell 2 means activation of DL CC 2 and UL CC 2. In such a sense, each component carrier may correspond to the cell.

The number of components carriers aggregated between the downlink and the uplink may be set differently. A case where the number of downlink CCs is equal to the number of uplink CCs is referred to as symmetric aggregation and a case where the number of downlink CCs is different from the number of uplink CCs is referred to as asymmetric aggregation. Further, the sizes (i.e. bandwidths) of the CCs may be different from each other. For example, when five CCs are used for configuration of a 70 MHz band, the configuration of the 70 MHz band may be configured like MHz CC (carrier #0)+20 MHz CC (carrier #1)+20 MHz CC (carrier #2)+20 MHz CC+5 MHz CC (carrier #4).

As described above, the carrier aggregation system may support a plurality of serving cells, that is, a plurality of component carriers (CC) unlike the single carrier system.

Meanwhile, the carrier aggregation system may support cross-carrier scheduling (CCS). The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier. That is, the PDCCH and the PDSCH may be transmitted through different DL CCs and the PUSCH may be transmitted through the UL CC linked with the DL CC in which the PDCCH including a UL grant is transmitted, that is, the UL CC included in another cell, not the UL CC constituting the same cell. Likewise, in a system supporting the cross carrier scheduling, a carrier indicator is required, which indicates through which DL CC/UL CC the PDCCH schedules the PDCCH/PUSCH transmitted. A field including such a carrier indicator is referred to as a carrier indication field (CIF).

The carrier aggregation system that supports the cross carrier scheduling may include the carrier indication field (CIF) in a downlink control information (DCI) format in the related art. In a system supporting the cross carrier scheduling, for example, the LTE-A system, since the CIF is added to the DCI format (i.e., the DCI format used in LTE) in the related art, 3 bits may be extended and in a PDCCH structure, a coding method, a resource allocation method (i.e., CCE based resource mapping), and the like in the related art may be reused.

The base station may configure a PDCCH monitoring DL CC (monitoring CC) set. The PDCCH monitoring DL CC set is constituted by some DL CCs among all DL CCs and when the cross carrier scheduling is configured, the UE performs PDCCH monitoring/decoding only for the DL CCs included in the PDCCH monitoring DL CC set. In other words, the base station transmits the PDCCH for the PDSCH/PUSCH to be scheduled only through the DL CC included in the PDCCH monitoring DL CC set. The PDCCH monitoring DL CC set may be configured to UE-specific, UE-group specific, or cell-specific.

Non-cross carrier scheduling (NCCS) means that scheduling information and the resulting data are received/transmitted within the same carrier (cell) and may be referred to as self-scheduling. The non-cross carrier scheduling may be regarded as a scheduling method applied to a UE in which only a single cell is configured in the related art.

Hereinafter, a PUCCH format will be described.

Figure 9:
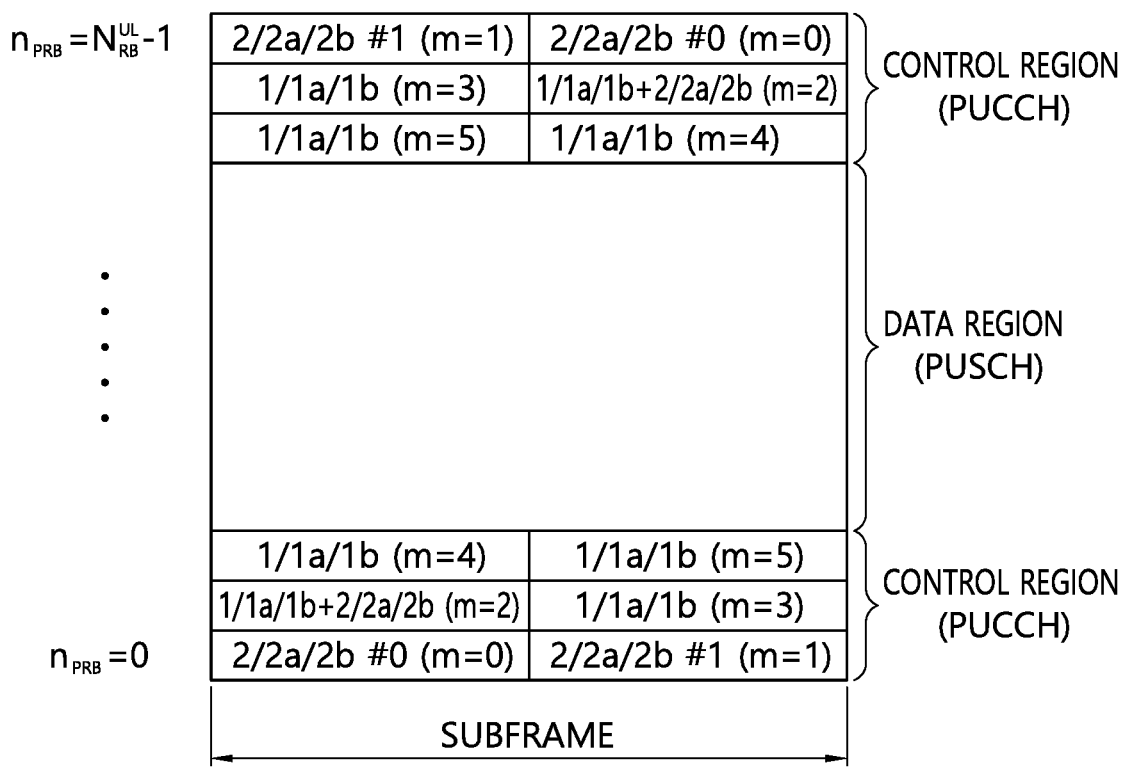
FIG. 9 is an exemplary diagram illustrating a transmission region depending on a PUCCH format.

FIG. 9 is an exemplary diagram illustrating a transmission region depending on a PUCCH format.

Referring to FIG. 9, the PUCCH formats will be described.

PUCCH format 1 caries a scheduling request (SR). In this case, an on-off keying (OOK) scheme may be applied. PUCCH format 1a carries acknowledgment/non-acknowledgement (ACK/NACK) modulated by a binary phase shift keying (BPSK) scheme for one codeword. PUCCH format 1b carries ACK/NACK modulated by a quadrature phase shift keying (QPSK) scheme for two codewords. PUCCH format 2 carries a channel quality indicator (CQI) modulated by the QPSK scheme. PUCCH formats 2a and 2b carry the CQI and the ACK/NACK.

A table below shows the PUCCH format.

TABLE 1

| Format | Modulation scheme | Total bit number per subframe | Description |
| --- | --- | --- | --- |
| Format 1 | Undefined | Undefined | Scheduling request (SR) |
| Format 1a | BPSK | 1 | ACK/NACK of 1-bit hybrid automatic repeat request (HARQ) and scheduling request (SR) may be present or not |

TABLE 1-continued

| Format | Modulation scheme | Total bit number per subframe | Description |
|---|---|---|---|
| Format 1b | QPSK | 2 | ACK/NACK of 2-bit hybrid automatic repeat request (HARQ) and scheduling request (SR) may be present or not |
| Format 2 | QPSK | 20 | In case of extended CP, channel state information (CSI) and 1 or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACK/NACKs and CSIs for carrier aggregation and scheduling request (SR) may be present or not |

Each PUCCH format is mapped and transmitted to a PUCCH region. For example, the PUCCH format 2/2a/2b is mapped and transmitted to a resource block (m=0, 1 in FIG. 6) of a band edge, which is allocated to the UE. The mixed PUCCH resource block (RB) may be mapped to a resource block (e.g., m=2) adjacent to the resource block to which the PUCCH format 2/2a/2b is allocated in the direction of the center of the band. The PUCCH format 1/1a/1b in which the scheduling request (SR) and the ACK/NACK is transmitted may be disposed in a resource block of m=4 or m=5. The number of resource blocks (N(2)RB) that may be used for the PUCCH format 2/2a/2b in which the CQI is transmitted may be indicated to the UE via a broadcasted signal.

Figure 10:
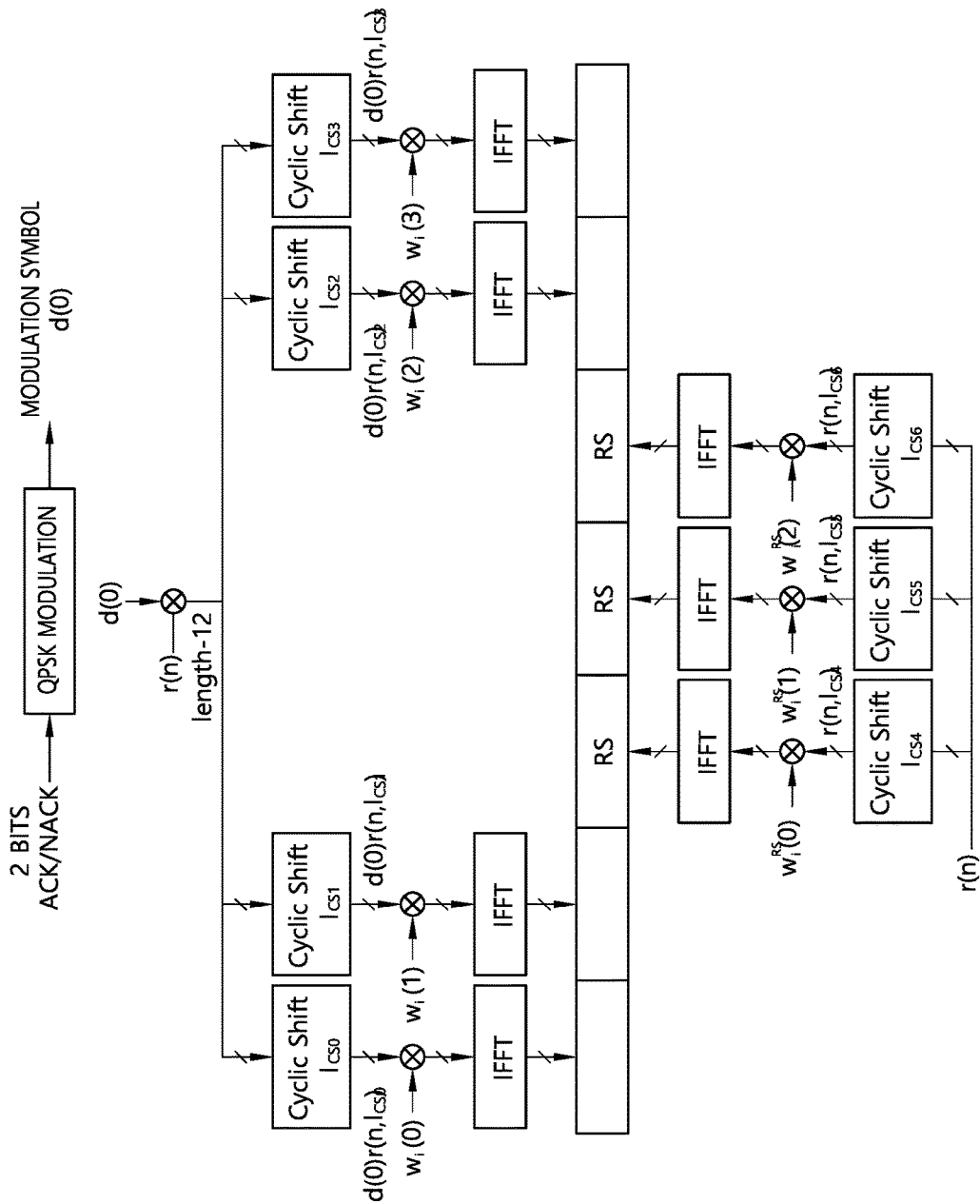
FIG. 10 illustrates a channel structure of PUCCH format 1b in a normal CP.

FIG. 10 illustrates a channel structure of PUCCH format 1b in a normal CP.

One slot includes 7 OFDM symbols, 3 OFDM symbols become OFDM symbol for a reference signal for demodulation, that is, a demodulation reference signal (DMRS), and 4 OFDM symbols become a data OFDM symbol for an ACK/NACK signal.

In the PUCCH format 1b, an encoded 2-bit ACK/NACK signal is quadrature phase shift keying (QPSK)-modulated to generate modulation symbol d(0).

A cyclic shift index $I_{cs}$ may vary depending on a slot number $n_s$ and/or a slot symbol index 1 in the radio frame.

In a normal CP, since 4 data OFDM symbols exist in one slot in order to transmit the ACK/NACK signal, cyclic shift indexes corresponding to respective data OFDM symbols are set as $I_{cs0}$, $I_{cs1}$, $I_{cs2}$, and $I_{cs3}$.

The modulation symbol d(0) is spread to a cyclic shifted sequence $r(n,I_{cs})$. When a 1D spread sequence corresponding to an (i+1)-th OFDM symbol in the slot is m(i), the 1D spread sequence may be expressed as $\{m(0), m(1), m(2), m(3)\} = \{d(0)r(n,I_{cs0}), d(0)r(n,I_{cs1}), d(0)r(n,I_{cs2}), d(0)r(n,I_{cs3})\}$.

In order to increase a UE capacity, the 1D spread sequence may be spread by using an orthogonal sequence. The following sequence is used as an orthogonal $w_i(k)$ (i represents a sequence index, 0≤k≤K−1) in which a spreading factor K is 4.

TABLE 2

| Index (i) | K = 4<br>[$w_i(0)$, $w_i(1)$, $w_i(2)$, $w_i(3)$] | K = 3<br>[$w_i(0)$, $w_i(1)$, $w_i(2)$] |
|---|---|---|
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

Different spreading factors may be used for each slot.

Therefore, when a predetermined orthogonal sequence index i is given, 2D spread sequences {s(0), s(1), s(2), s(3)} may be expressed as follows.

{s(0), s(1), s(2), s(3)} = {$w_i(0)m(0)$, $w_i(1)m(1)$, $w_i(2)m(2)$, $w_i(3)m(3)$}

The 2D spread sequences {s(0), s(1), s(2), s(3)} are transmitted in corresponding OFDM symbols after inverse fast Fourier transform (IFFT) is performed. As a result, the ACK/NACK signal is transmitted onto the PUCCH.

The reference signal of the PUCCH format 1b is transmitted by cyclic-shifting a base sequence r(n) and thereafter, spreading the cyclic-shifted sequence r(n) to the orthogonal sequence. When cyclic shift indexes corresponding to 3 RS OFDM symbols are $I_{cs4}$, $I_{cs5}$, and $I_{cs6}$, 3 cyclic-shifted sequences $r(n,I_{cs4})$, $r(n,I_{cs5})$, and $r(n,I_{cs6})$ may be acquired. 3 cyclic-shifted sequences are spread to an orthogonal sequence $w^{RS}_i(k)$ in which K=3.

An orthogonal sequence index i, a cyclic shift index $I_{cs}$, and a resource block index m are parameters required for configuring the PUCCH and resources used to distinguish the PUCCH (alternatively, UE). When the number of available cyclic shifts is 12 and the number of available orthogonal sequence indexes is 3, the PUCCHs for a total of 36 UEs may be multiplexed to one resource block.

In the 3GPP LTE, a resource index $n^{(1)}_{PUCCH}$ is defined in order for the UE to acquire 3 parameters for configuring the PUCCH. The resource index is defined as $n^{(1)}_{PUCCH} = n_{CCE} + N^{(1)}_{PUCCH}$, and $n_{CCE}$ represents a number of a first CCE used for transmitting a corresponding PDCCH (that is, a PDCCH including downlink resource allocation (DCI) to schedule downlink data corresponding to the ACK/NACK signal) and $N^{(1)}_{PUCCH}$ represents a parameter which the base station announces to the UE as a higher layer message.

Time, frequency, and code resources used for transmitting the ACK/NACK signal are referred to as an ACK/NACK resource or a PUCCH resource. As described above, an index (an ACK/NACK resource index or a PUCCH index) of the ACK/NACK resource required to transmit the ACK/NACK signal onto the PUCCH may be expressed as at least any one of the orthogonal sequence index i, the cyclic shift index $I_{cs}$, the resource block index m, and an index for acquiring the three indexes. The ACK/NACK resource may include at least any one of the orthogonal sequence, the cyclic shift, the resource block, and a combination thereof.

Figure 11:
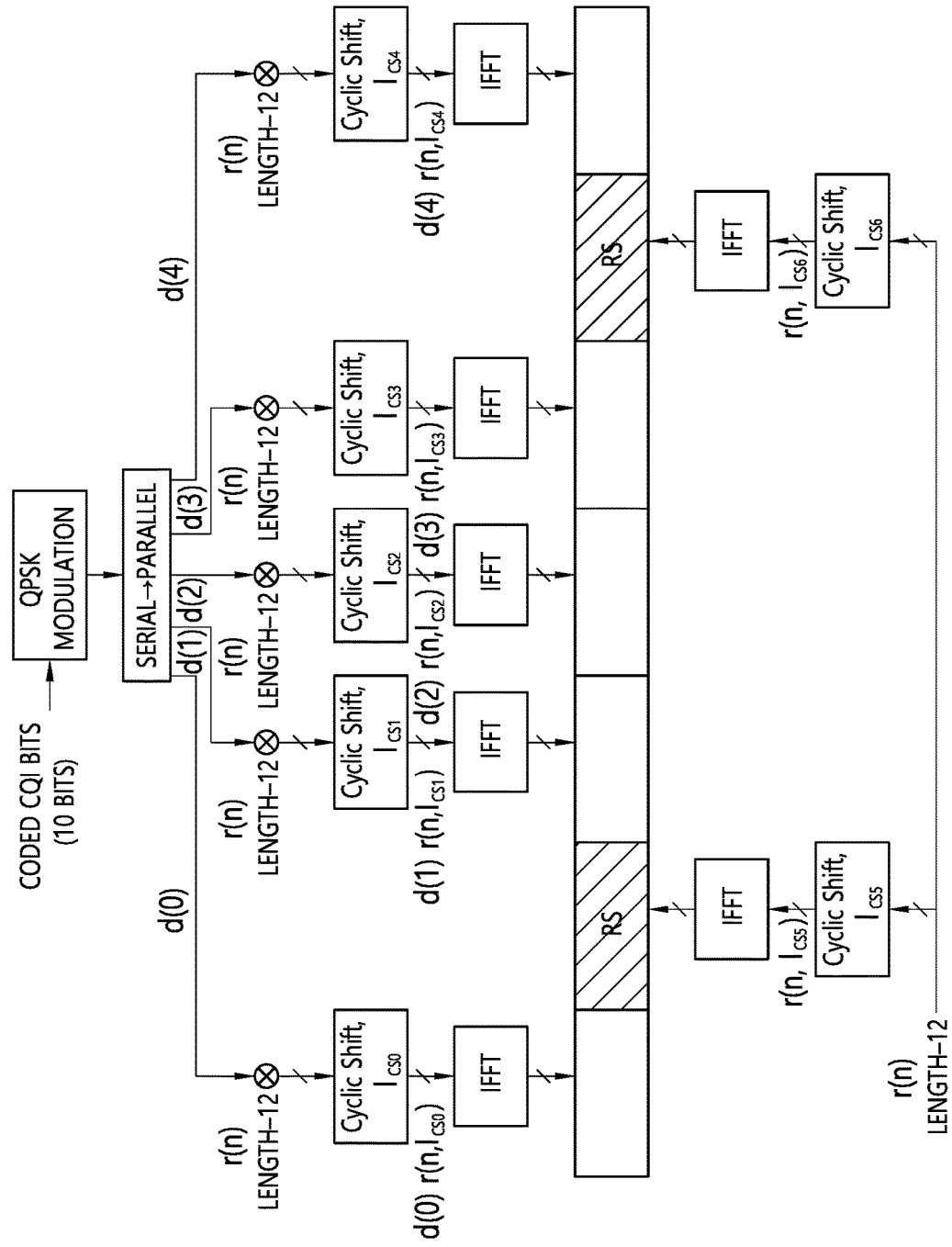
FIG. 11 illustrates the channel structure of PUCCH format 2/2a/2b in the normal CP.

FIG. 11 illustrates the channel structure of PUCCH format 2/2a/2b in the normal CP.

Referring to FIG. 11, OFDM symbols 1 and 5 (that is, second and sixth OFDM symbols) are used for the reference signal (DMRS) for demodulation and residual OFDM symbols are used for CQI transmission in the normal CP. In the extended CP, OFDM symbol 3 (a fourth symbol) is used for the DMRS.

10 CQI bits are channel-coded at, for example, 1/2 code rate to become 20 coded bits. A Reed-Muller code may be used in the channel coding. In addition, the Reed-Muller code is scrambled and thereafter, constellation-mapped, and as a result, a QPSK modulation symbol is generated (d(0) to d(4) in slot 0). Each QPSK modulation symbol is modulated by cyclic shift of the basic RS sequence r(n) having a length of 12 and subjected to the IFFT to be transmitted in 10 respective SC-FDMA symbols in the subframe. 12 cyclic shifts which are spaced apart from each other allow 12 different UEs to be orthogonally multiplexed in the same PUCCH resource block. The basic RS sequence r(n) may be used as RS sequences applied to OFDM symbols 1 and 5.

Figure 12:
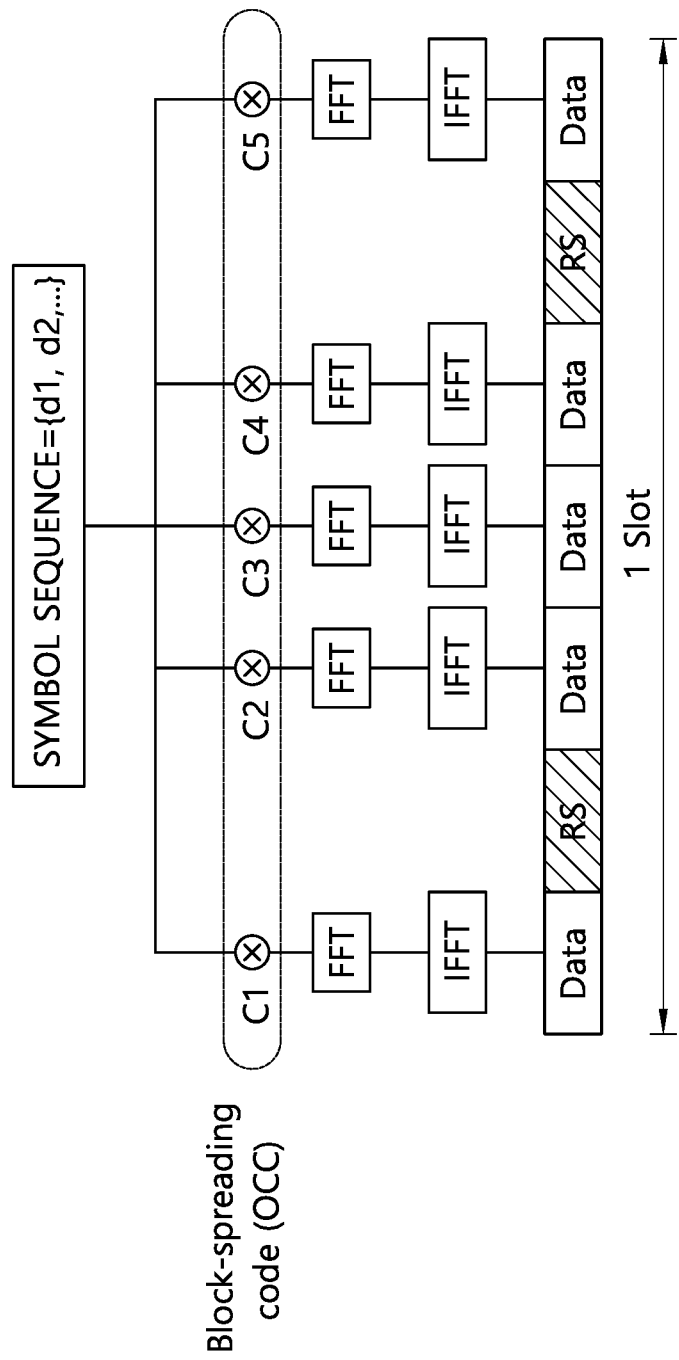
FIG. 12 illustrates the channel structure of PUCCH format 3.

FIG. 12 illustrates the channel structure of PUCCH format 3.

Referring to FIG. 12, PUCCH format 3 is a PUCCH format using a block spreading technique. The block spreading technique means a method that spreads a symbol sequence in which multi-bit ACK/NACK is a time domain by using a block spreading code.

In PUCCH format 3, the symbol sequence (e.g., an ACK/NACK symbol sequence) is spread and transmitted in the time domain by the block spreading code. An orthogonal cover code (OCC) may be used as the block spreading code. Control signals of multiple UEs may be multiplexed by the block spreading code. PUCCH format 2 is different from the PUCCH format 3 in that in PUCCH format 2, symbols (e.g., d(0), d(1), d(2), d(3), d(4), etc., of FIG. 11) transmitted in the respective data symbols are different from each other and UE multiplexing is performed by using the cyclic shift of a constant amplitude zero auto-correlation (CAZAC) sequence, while in the PUCCH format 3, the symbol sequence constituted by one or more symbols is transmitted throughout a frequency domain of each data symbol and spread in the time domain by the block spreading code to perform the UE multiplexing. In FIG. 12, a case where 2 DMRS symbols are used in one slot is illustrated, but the present invention is not limited thereto and 3 DMRS symbols may be used and the orthogonal cover code having 4 as the spread factor may be used. The DMRS symbol may be generated from the CAZAC sequence having a specific cyclic shift and transmitted in a manner that a plurality of DMRS symbols of the time domain is multiplied by a specific orthogonal cover code.

Hereinafter, the present invention will be described.

In the carrier aggregation technique, there may be the primary cell and the secondary cell. When the primary cell and a plurality of secondary cells are configured in the UE, the UE transmits (uplink control) information of the secondary cell to the base station (as well as primary cell related information (uplink control) information) through the primary cell (e.g., through the PUCCH and/or PUSCH of the primary cell).

As described above, one primary cell and the plurality of secondary cells may be configured in the UE. In this case, when one primary cell and a large number of cells are configured (i.e., secondary cells of a reference value (predetermined value) or more are configured), since information on a large number of secondary cells needs to be (as well as primary cell related (uplink control) information) by using only the PUCCH and/or PUSCH of one primary cell, there may be a problem in that a payload of the (uplink control) information transmitted from the primary cell to the base station is excessively increased.

For example, assuming that one primary cell and 31 primary cells are configured, the UE may need to transmit the (uplink control) information of 31 secondary cells (as well as the primary cell related (uplink control) information) using only the PUCCH of the primary cell, and as a result, the payload of the (uplink control) information transmitted in the primary cell may be excessively increased.

Accordingly, the present invention intends to provide a method for efficiently transmitting (uplink control) information related to a plurality of cells to the base station when a large number of cells are configured as a carrier aggregation technique.

Herein, in the present invention, proposed is a method when a large number of cell(s) are configured by the carrier aggregation technique (CA), the UE performs multiple periodic channel state information (P-CSI) report(s) related to the plurality of cell(s) efficiently (concurrently). That is, in the method provided in the present invention, a method in which the UE efficiently transmits a plurality of CSIs to a network is provided.

The CSI may include a rank indication (RI), a precoder matrix indication (PMI), and/or channel quality information (CQI). Herein, the RI may provide information on a recommendation value for a rank used for (downlink) transmission, i.e., information on the number of layers to be used for the downlink transmission to the corresponding UE, the PMI may indicate what a precoding matrix to be used for transmitting a DL-SCH is, and the CQI may mean a modulation and coding scheme (MCS) which is highest as possible for transmitting the PDSCH which may be received at block error rate of a predetermined value or less when the RI and the PMI which are recommended are used.

Hereinafter, for easy description, as an example, a license-based cell and an unlicensed cell (LTE-U) based (S)cell are named as "LCELL" and "UCELL", respectively and further, a resource section which is aperiodically secured/configured in the corresponding UCELL is named as "reserved resource period (RRP)".

As another example, a rule may be defined so that a PDSCH related control information channel (or an uplink subframe (UL SF) (i.e., a subframe designated for an uplink purpose) in an RRP section) transmitted on a downlink subframe (DL SF) (i.e., a subframe designated for a downlink purpose) of the RRP section is configured to be transmitted in a predefined LCELL (i.e., named as "cross carrier scheduling (CCS)") and transmitted form the same UCELL (i.e., named as "self-scheduling (SFS)").

As yet another example, a PDSCH reception related downlink control information channel on the RRP section may be implemented to schedule one PDSCH in which one downlink control information channel is received at the same (or a specific) time (i.e., named as "single subframe scheduling (SSFS)") or implemented to schedule one PDSCH in which one downlink control information channel is received at the same (or a specific) time and predefined (or signaled) number of PDSCHs received at different time (i.e., named as "multi-subframe scheduling (MSFS)").

As an example, considering that the RRP section on the UCELL is a resource that is either aperiodically or discontinuously configured depending on a carrier sensing (CS) result, the corresponding RRP section may be (re)defined (or (re)construed) in terms of a UE operation and assumption.

Herein, as an example, the RRP section in the UCELL may be (re)defined as a section in which it is assumed that the UE performs a (time/frequency) synchronization operation for the UCELL or a synchronization signal (e.g., PSS or SSS) for performing the synchronization operation is transmitted (from the eNB) and/or a section in which it is assumed that the UE performs a CSI measurement operation for the UCELL or a reference signal (e.g., CRS or CSI-RS) for performing the CIS measurement operation is transmitted (from the eNB) and/or a section in which it is assumed that the UE performs a DCI detection operation related to data transmission (/reception) in the UCELL and/or the UE performs a (momentary or temporary) buffering operation for a signal received in the UCELL.

Hereinafter, for easy description, the proposal method will be described based on the 3GPP LTE system. However, a range of the system to which the proposal method is applied may be extended to other systems (e.g., UTRA, and the like) other than the 3GPP LTE system.

Further, in the present invention, for easy description, (existing) PUCCH format 2 (/2A/2B) and PUCCH format 3 are named as "PF2" and "PF3", respectively and a PUCCH format (newly) defined (/introduced) for supporting (multiple) periodic CSI (P-CSI) report(s) is named as "MP_PF". Here, as an example, MP_PF may be defined as 'PF3 type' or 'a form other than the existing PF'.

In summary, the MP_PF may refer to a PUCCH format that is used (or supported) to perform periodic CSI reporting on a large number of cells (particularly, a large number of cells which are carrier-aggregated) and in this case, the MP_PF may mean a PUCCH format that supports the periodic CSI reporting. That is, the MP_PF may mean a PUCCH format that supports more CSI reports than PF2 and/or PF3.

Hereinafter, a specific embodiment of the present invention, that is, 1. A method for selecting a PUCCH format (hereinafter, referred to as PF) (or 'FORMAT ADAPTION') (to be used) according to a predetermined (/ signaled) condition and thereafter, transmitting the CSI report and the HARQ ACK to the selected PF based on the selected PF and 2. A method for transmitting the CSI report and the HARQ ACK to the base station based on a predetermined (/ signaled) priority of the CSI and an HARQ-ACK (spatial or time) bundling application criterion will be described through drawings.

1. A method of selecting the PUCCH format (to be used) according to a predetermined (/ signaled) condition and thereafter, transmitting the CSI report and the HARQ ACK to the base station based on the selected PF FIG. 13 is a flowchart of a method for selecting a PUCCH format according to an embodiment of the present invention.

Figure 13:
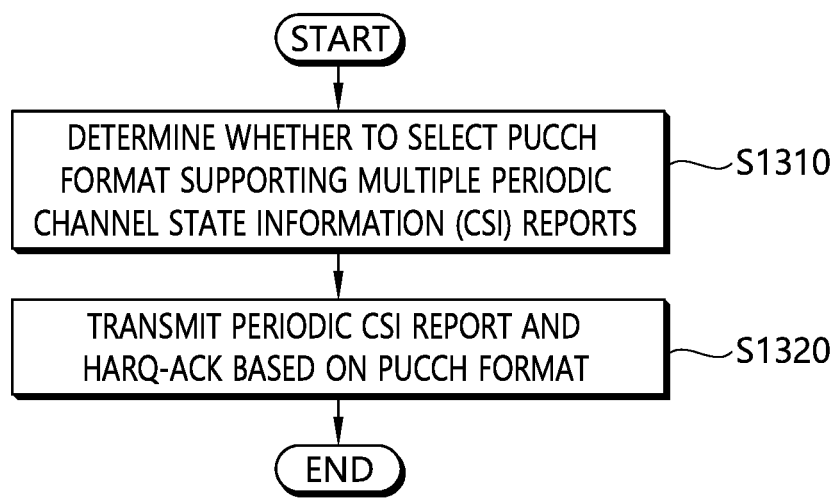
FIG. 13 is a flowchart of a method for selecting a PUCCH format according to an embodiment of the present invention.

Referring to FIG. 13, the UE may determine whether to select a PUCCH format supporting multiple periodic CSI reports (S1310). As an example, when the UE needs to transmit the periodic CSI report for a large number of cells through the primary cell, the UE may determine whether to select the PUCCH format that supports the multiple periodic CSI reports. That is, the UE may determine whether to select the PUCCH format supporting the multiple periodic CSI reports or whether to select the existing PF (e.g., PF2).

More specifically,

[Proposal Method #1] When the following (some or all) conditions are satisfied, a rule may be defined to perform (multiple) P-CSI report(s) by the MP_PF instead of the existing PF2.

Herein, as an example, the application of the rule may be construed as a 'FORMAT ADAPTATION' operation from the PF2 to the MP_PF or construed to perform the (multiple) P-CSI report(s) only by the MP_PF without a fallback.

(Condition #1-1) A larger number of cell(s) than a predefined (or signaled) threshold are configured by the CA. Herein, the threshold may be set to '5' (or '8') (and/or a predefined (or signaled) specific TDD UL-DL CONFIGURATION (e.g.,) TDD UL-DL CONFIGURATION #5).

(Condition #1-2) When a predefined 'MULTIPLE P-CSI REPORT MODE' is configured.

(Condition #1-3) When a total bit size (or the total number of P-CSI report(s) of which reporting time overlaps (or which are simultaneously reported) or the total number of (P-CSI report(s) related) CSI process(es)) is larger than a predefined (or signaled) threshold. Here, as an example, the corresponding threshold may be set to '11 bits (or 13 bits) (based on the existing PF2)' (or '1 P-CSI report' or '1 (P-CSI report related) CSI PROCESS').

In this case, the reason for considering the number of (P-CSI report(s) related) CSI processes is that a (P-CSI report(s) related) payload size which the UE needs to transmit also increases when a lot of CSI processes are configured in general.

[Proposal Method #2] When an existing HARQ-ACK FALLBACK situation occurs, the (multiple) P-CSI report(s) and/or HARQ-ACK transmission (TX) may be configured to be performed.

More specifically, when the MP_PF-based (multiple) P-CSI report(s) is performed (according to [Proposal Method #1]), if the existing HARQ-ACK FALLBACK (or PUCCH FORMAT FALLBACK) situation (e.g., a case where (one) 'DL-DAI=1' PDCCH is received only in TDD PCELL) occurs, TDD PCELL), (multiple) P-CSI report(s) and/or HARQ-ACK TRANSMISSION (TX) may be configured to be transmitted according to the following (some or all) rule.

For example, when the terminal has to report the CSI despite a situation that the UE needs to fall back from PF3 (or MP_PF) to PF1, the UE may newly select the PF (supporting CSI reporting) other than the PF1 (because the PF1 does not support CSI reporting). That is, in the fallback situation, the UE may perform PF selection (or 'FORMAT ADAPTATION').

(Rule #2-1) The 'FORMAT ADAPTATION' operation may be configured to be performed between a predefined (or signaled) PF (e.g., PF2) and MP_PF when the following (some or all) conditions are met.

(Condition #2-1-1) When total sum bit sizes related with the P-CSI report(s) where the reporting time overlaps (or which are reported at the same time) and the HARQ-ACK TX are larger than a predefined (or signaled) threshold (e.g.,) '12 bits' (or '14 bits') (when HARQ-ACK information is 1 bit) or '13 bits' (or '15 bits') (when the HARQ-ACK information is 2 bits).

(Condition #2-1-2) When (the above-described) (Condition #1-3) is met. Herein, for example, (condition #2-1-2) may be construed as not considering the bit(s) related to the HARQ-ACK TX in which the reporting time overlaps (or which is simultaneously reported).

(Rule #2-2) The HARQ-ACK bit (/ SYMBOL) where the reporting time overlaps (or which is reported at the same time) may be configured to be modulated to an RS (e.g., DM-RS) of the MP_PF (similar to the case of the existing PF2).

(Rule #2-3) The HARQ-ACK bit (/ SYMBOL) where the reporting time overlaps (or which is reported at the same time) may be configured to be masked to a CRC related to the MP_PF.

Thereafter, the UE may transmit a periodic CSI report and an HARQ-ACK based on the PUCCH format (S1320). For example, when the UE selects the PUCCH format based on the above-described criteria, the UE may transmit the periodic CSI report and the HARQ-ACK based on the PUCCH format.

In this case, when the UE performs the periodic CSI reporting based on the MP_PF, the UE may apply the following channel coding. That is, the UE may configure channel coding to be applied to the above-described (multiple) P-CSI report(s) (and/or HARQ-ACK TX) related (information) bit(s). More specifically,

[Proposal Method #3] When MP_PF based (multiple) P-CSI report(s) (and/or HARQ-ACK TX) is performed (according to [Proposal Method #1] and/or [Proposal Method #2], the channel coding may be configured to be applied to (multiple) P-CSI report(s) (and/or HARQ-ACK TX) related (information) bit(s) according to the following (some or all) rules.

Herein, as an example, in [Proposal Method #3], the rule may be defined to be limitedly applied only to a case where the MP_PF is set to 'PF3 (type)' (or 'a type different from the existing PF'). Further, as an example, in [Proposal Method #3], the P-CSI report(s) may be limitedly construed only as CQI information report and/or PMI information report (and/or RI information report).

(Rule #3-1) The rule may be defined so that when the total sum (information) bit size related to P-CSI report(s) where the reporting time overlaps (which is reported at the same time) is equal to or smaller than '21 bits' (or '22 bits'), 'RM CODING' is applied and when the total sum (information) bit size is larger than '21 bits' (or '22 bits'), 'TBCC CODING' is applied (by reusing the criterion applied to the HARQ-ACK (information) bit(s) based on the existing PF3).

Herein, as an example, the rule may be defined so that when the TOTAL SUM (INFORMATION) bit SIZE related to the P-CSI report(s) where the reporting time overlaps (which is reported at the same time) is equal or smaller than '11 bits' (or '21 bits'), 'SINGLE RM CODING (W/ INTERLEAVING or W/O INTERLEAVING)' is applied and when the TOTAL SUM (INFORMATION) bit SIZE is larger than '11 bits' (or '12 bits') and equal to or smaller than '21 bits' (or '22 bits'), 'DUAL RM CODING (W/ INTERLEAVING or W/O INTERLEAVING)' is applied.

(Rule #3-2) The rule may be (continuously) defined so that 'TBCC CODING' is applied.

(Rule #3-3) The rule may be defined so that when the total sum (information) bit size related to P-CSI report(s) where the reporting time overlaps (which is reported at the same time) is equal to or smaller than '11 bits' (or '13 bits'), 'RM CODING' is applied and when the total sum (information) bit size is larger than '11 bits' (or '13 bits'), 'TBCC CODING' is applied (by reusing the criterion applied to the P-CSI (and/or HARQ-ACK) (information) bit(s) based on the existing PF2).

Herein, as an example, when 'RM CODING' is applied, the eNB may inform the UE of information (or an indicator) regarding which 'RM CODING of (20, A)' and RM CODING of (32, A)' is applied through a predefined signaling (e.g., an upper layer signaling or a physical layer signaling).

(Rule #3-4) In the case where (multiple) P-CSI report(s) and HARQ-ACK TX are performed through the MP_PF, the rule may be defined so that when the total sum (information) bit sizes related to the P-CSI report(s) and the HARQ-ACK TX (where the reporting time overlaps (or which is simultaneously reported)) are equal to or smaller than '21 bits' (or '22 bits'), 'RM CODING' is applied and when the total sum (information) bit sizes are larger than '21 bits (or '22 bits'), 'TBCC CODING' is applied (the rule may be defined so that when the total sum (information) bit sizes related to the P-CSI report(s) and the HARQ-ACK TX (where the reporting time overlaps (or which is simultaneously reported)) are equal to or smaller than '11 bits' (or '13 bits'), 'RM CODING' is applied and when the total sum (information) bit sizes are larger than '11 bits' (or '13 bits'), 'TBCC CODING' is applied).

(Rule #3-5) The rule may be defined so that when the total sum (information) bit size (or the total number of P-CSI report(s) or (the total number of (P-CSI report(s) related) CSI PROCESS(ES)) (and/or the HARQ-ACK TX) (where the reporting time overlaps (or which is simultaneously reported)) is larger (smaller) than a predefined (or signaled) threshold (when 'TBCC CODING' (or 'RM CODING') is applied to P-CSI report(s) (and/or HARQ-ACK TX) related (information) bit(S)) (when (Rule #3-1) and/or (Rule #3-2) and/or (Rule #3-3) and/or (Rule #3-1) are/is applied), a CRC (e.g., 8 bits) having a predefined (or signaled) size is attached.

Herein, as an example, the corresponding threshold may be set to '11 bits' (or '13 bits') (or '21 bits' (or '22 bits')) (or '1 P-CSI report' or '1 (P-CSI report related) CSI PROCESS')) by using reusing the criterion applied to the existing 'CQI/PMI PIGGYBACKED ON PUSCH'.

For example, when simultaneous transmission of HARQ-ACK information and (multiple) P-CSI information is configured (in [Proposal Method #1] and/or [Proposal Method #2] and/or [Proposal Method #3]), 'PF selection/configuration' and/or 'corresponding selected/configured PF based HARQ-ACK information and (multiple) P-CSI information transmission' may be performed according to the following (some or all) rule.

(Example #1) 'PF selection/configuration' is performed based on only HARQ-ACK (information#) bit(s) (or HARQ-ACK & (multiple) P-CSI (information) bit(s) and according to the number of remaining bits (and/or whether remaining bit(s) exists) excluding the number of HARQ-ACK (information) bits among the number of information bits that may be transmitted through the corresponding selected/configured PF, whether to finally (simultaneously) transmit (multiple) P-CSI information is determined.

This example (that is, Example #1) is described below through the drawings.

Figure 14:
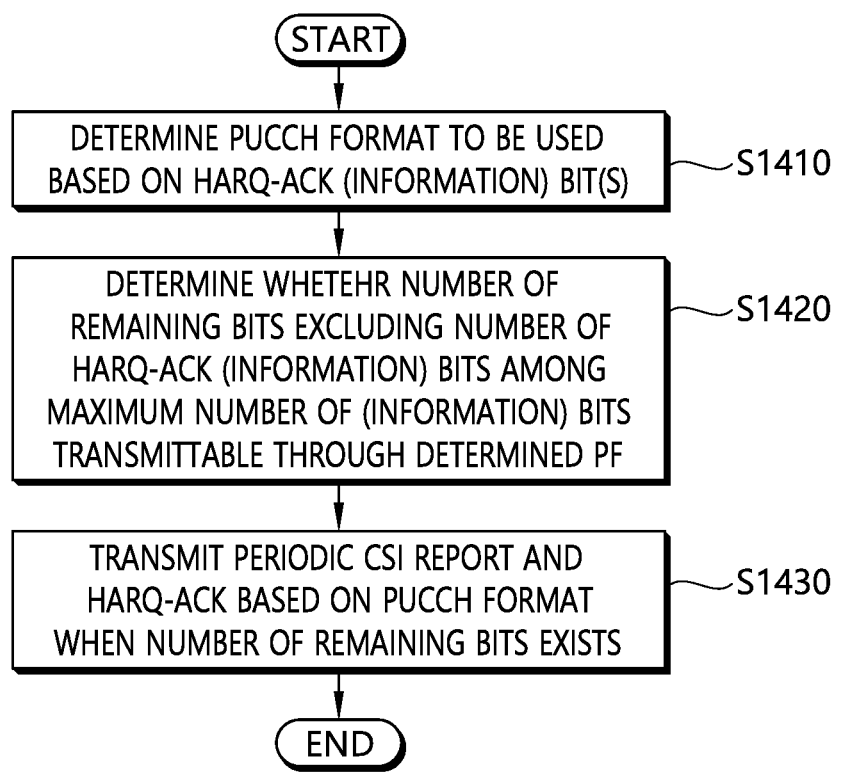
FIG. 14 is a flowchart of a method for selecting a PUCCH format according to another embodiment of the present invention.

FIG. 14 is a flowchart of a method for selecting a PUCCH format according to another embodiment of the present invention.

Referring to FIG. 14, the UE may determine a PUCCH format to be used based on HARQ-ACK (information) bit(s) (S1410). That is, the UE may select the PF considering only HARQ-ACK (information) bit(s). In other words, the UE may select the PF considering only the HARQ-ACK (information) bit(s) without considering the P-CSI bits. In this case, a detailed example in which the UE selects the PUCCH format is as described above.

Thereafter, the UE determines whether there is a remaining number of bits excluding the number of HARQ-ACK (information) bits among the maximum number of bits that may be transmitted through the determined PF (S1420). That is, the UE may determine whether the number of remaining bits excluding the HARQ-ACK bits exists among the number of bits that may be transmitted through the selected PF.

Thereafter, when the number of remaining bits excluding the HARQ-ACK bit exists among the maximum number of bits that may be transmitted through the PF, the UE may transmit the periodic CSI report and the HARQ-ACK based on the PUCCH format (S1430). That is, the UE may transmit the periodic CSI report and the HARQ-ACK by allocating the periodic CSI report to the remaining bits. In this case, a detailed example in which the UE transmits the periodic CSI report and the HARQ ACK is as described above.

(Example #2) 'Whether HARQ-ACK information and (multiple) P-CSI information are transmitted simultaneously' may be independently indicated/configured for each PF.

2. Method of transmitting CSI report and HARQ ACK to base station based on priority of preconfigured (/ signaled) CSI and HARQ-ACK (SPATIAL or TIME) bundling application criterion When the UE needs to simultaneously transmit the CSI report and the HARQ ACK to the base station, since the resources of the PUCCH of the primary cell are limited, the UE may not transmit both the CSI report and the HARQ ACK to the BS. Accordingly, it may be necessary for the UE to select only a part of the CSI report and transmit the selected partial CSI report to the base station (together with the HARQ ACK). In this case, the UE needs a criterion regarding which CSI report to transmit to the base station, and as a result, the present invention provides a method for transmitting the (selected) CSI report to the base station according to the priority. The present invention also provides a method for transmitting the CSI report to the base station by bundling the HARQ ACK according to a previously configured (/ signaled) criterion through an example.

Hereinafter, the method for transmitting the CSI report and the HARQ ACK to the base station based on the priority of the CSI will be described in detail. Herein, in the specification, for easy description, an embodiment of the method for transmitting the CSI report and the HARQ ACK to the base station based on the CSI priority is solely described, but this is just described only for easy description and the following embodiment may be implemented in combination with or independently from the above-described embodiments.

Figure 15:
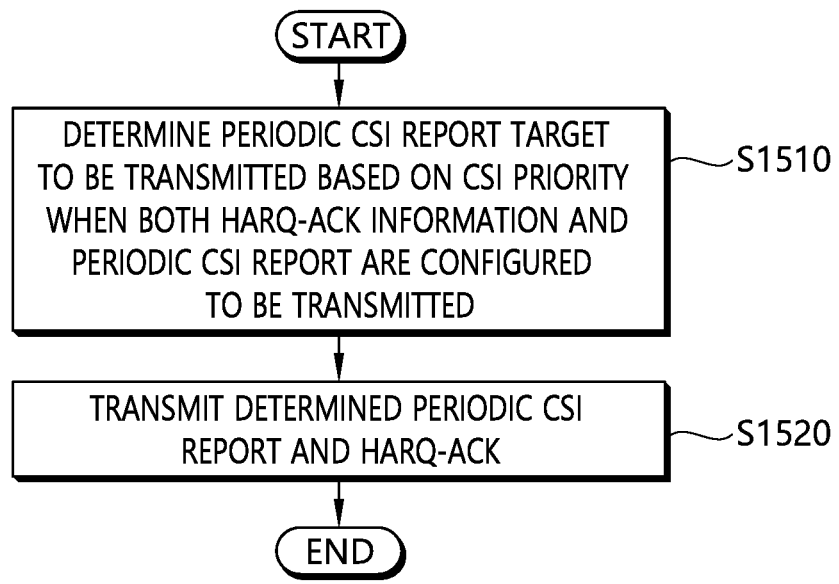
FIG. 15 is a flowchart of a method for determining a periodic CSI report target to be transmitted based on a CSI priority according to an embodiment of the present invention.

FIG. 15 is a flowchart of a method for determining a periodic CSI report target to be transmitted based on a CSI priority according to an embodiment of the present invention.

Referring to FIG. 15, when both the HARQ-ACK information and periodic CSI report are configured to be transmitted to the UE, the UE may determine the periodic CSI report target to be transmitted based on the CSI priority (S1510). In this case, the CSI priority may be determined by considering/comparing parameters of "([OPTION#A] CG INDEX->) P-CSI REPORTING TYPE->([OPTION#B] CG INDEX->) CSI PROCESS INDEX(/ID)->([OPTION#C] CG INDEX->) CELL INDEX->CSI SF SET INDEX" in sequence (left to right).

As a specific example, a P-CSI report related to a relatively low (or high) CG INDEX and/or CELL INDEX and/or CSI SF SET INDEX and/or CSI PROCESS INDEX (/ID) may be configured to have a higher priority (and/or an LCELL (or UCELL) related P-CSI report has a higher priority than a UCELL (or LCELL) related P-CSI report and/or a PUCCH TX CELL related P-CSI report has a higher priority than a non-PUCCH TX CELL related P-report). Herein, as an example, [OPTION #A], [OPTION #B], and [OPTION #C] may indicate (candidate) positions into which a 'CG INDEX' related parameter may be inserted. Herein, as an example, when the CSI priority is applied, it is possible to mitigate a problem that appreciation of a type of the periodic CSI report selected/reported by the UE is constant between the BS and the UE.

Moreover, according to the embodiment of the present invention, HARQ ACK bundling is be applied according to a previously configured (/ signaled) criterion to increase the number of CSIs that may be sent. That is, the size (/amount) of the (multiple) P-CSI information) finally transmitted simultaneously with the HARQ-ACK information may be changed depending on whether HARQ-ACK (SPATIAL or TIME) BUNDLING is performed.

More specifically,

[Proposal Method #4] When simultaneous transmission of the HARQ-ACK information and the (multiple) P-CSI information is configured ([Proposal Method #1] and/or [Proposal Method #2] and/or [Proposal Method #3]), 'whether HARQ-ACK (SPATIAL or TIME) BUNDLING is performed' and/or 'the size (/amount) of the (multiple) P-CSI information' finally transmitted simultaneously with the HARQ-ACK information' may be configured to be determined according to the following (some or all) rule.

Herein, as another example, when the maximum number of P-CSI reports which may be transmitted (concurrently) simultaneously with the HARQ-ACK information may be set to '1' when the HARQ-ACK bundling is not performed/ applied and a plural number (e.g., 2) when the HARQ-ACK bundling is performed/applied.

(Rule #4-1) The UE may not transmit the P-CSI information related to the P-CSI report together with the HARQ ACK information before the HARQ ACK bundling, but after the HARQ ACK bundling, when the P-CSI information related to the P-CSI may be transmitted together with the HARQ ACK information, the UE may be configured to perform the HARQ ACK bundling.

More specifically, the rule may be defined to perform/ apply the HARQ ACK bundling when the UE may not transmit the P-CSI report(s) related P-CSI information(s) (or a predefined (or signaled) number of P-CSI report(s) related P-CSI information(s) or a predefined (or signaled) bit number of P-CSI information(s)) to be transmitted at a specific time together (simultaneously) with the HARQ ACK information before the HARQ ACK bundling is performed/ applied and may transmit the P-CSI report(s) related P-CSI information(s) (or a predefined (or signaled) number of P-CSI report(s) related P-CSI information(s) or a predefined (or signaled) bit number of P-CSI information(s)) to be transmitted at the corresponding specific time together (simultaneously) with the HARQ ACK information after the HARQ ACK bundling is performed/applied.

Herein, as an example, it may be construed that the reason why the P-CSI report(s) related P-CSI information(s) (or a predefined (or signaled) number of P-CSI report(s) related P-CSI information(s) or a predefined (or signaled) bit number of P-CSI information(s)) to be transmitted may not be transmitted at the specific time together (simultaneously) with the HARQ ACK information is that the number of remaining bits excluding the number of HARQ ACK (information) bits among the maximum number of (information) bits which may be transmitted through the PF (e.g., MP_PF) is smaller than the amount of the P-CSI report(s) related P-CSI information(s) (or the amount of the predefined (or signaled) number of P-CSI report(s) related P-CSI information(s) or a predefined (or signaled) bit number of P-CSI information(s)) to be transmitted at the corresponding specific time.

In addition, as an example, when (Rule #4-1) is applied, the HARQ ACK bundling may be configured not to be performed/applied if the P-CSI report(s)-related P-CSI information(s) (or a predefined (or signaled) number of (e.g., 1) P-CSI report(s) related P-CSI information(s) or a predefined (or signaled) bit number of P-CSI information(s)) to be transmitted at a specific time may be transmitted together (simultaneously) with the HARQ ACK information before the HARQ ACK bundling is performed/applied.

In addition, as an example, the rule may be defined so that when (Rule #4-1) is applied, if the P-CSI information amount (/size) (RQ_PCSIBIT) related to the P-CSI report(s) to be transmitted at a specific time is larger than the predefined (or signaled) maximum simultaneously allowable information amount (/size) (e.g., the amount (/amount (/size) of a predefined (or signaled) number of P-CSI report(s) related P-CSI information or a predefined (or signaled) bit number of P-CSI information(s)) (TH_PCSIBIT) which is simultaneously transmitted, only a maximum of N P-CSI report(s) having a relatively higher priority, which meets a condition of "the amount (/size) of N P-CSI report(s) related P-CSI information≤TH_PCSIBIT" (that is, the remaining P-CSI report(s) may be omitted).

Herein, as an example, the priority may be determined by considering/comparing parameters of "([OPTION#A] CG INDEX->) P-CSI REPORTING TYPE->([OPTION#B] CG INDEX->) CSI PROCESS INDEX(/ID)->([OPTION#C] CG INDEX->) CELL INDEX->CSI SF SET INDEX" in sequence (left to right) and as a specific example, a P-CSI report related to a relatively low (or high) CG INDEX and/or CELL INDEX and/or CSI SF SET INDEX and/or CSI PROCESS INDEX (/ID) may be configured to have a higher priority (and/or an LCELL (or UCELL) related P-CSI report has a higher priority than a UCELL (or LCELL) related P-CSI report and/or a PUCCH TX CELL related P-CSI report has a higher priority than a non-PUCCH TX CELL related P-CSI report). Herein, as an example, [OPTION #A], [OPTION #B], and [OPTION #C] indicate (candidate) positions into which a 'CG INDEX' related parameter may be inserted.

(Rule #4-2) The rule may be defined so that the HARQ ACK bundling is performed/applied when by comparing the number of P-CSI reports (or P-CSI information size (/amount)) (NOBUN_PCSIBIT) that may be transmitted together (concurrently) with the HARQ-ACK information before the HARQ-ACK bundling is performed/applied and the number of P-CSI reports (or P-CSI information size (/amount)) (AFBUN_PCSIBIT) that may be transmitted together (concurrently) with the HARQ-ACK information after the HARQ-ACK bundling is performed/applied, the latter (AFBUN_PCSIBIT) is the larger.

In addition, as an example, when (Rule #4-2) is applied, the rule may be defined not to perform/apply the HARQ-ACK bundling when a relationship of "NOBUN_PCSIBIT=AFBUN_PCSIBIT" is established.

When Rule #4-2 is compared with Rule #4-1, in Rule #4-1, when the UE may not transmit the P-CSI information related to P-CSI reporting together with the HARQ ACK information before the HARQ ACK bundling, but may transmit the P-CSI related P-CSI information together with the HARQ ACK information after the HARQ ACK bundling, the UE is configured to perform the HARQ ACK bundling and in Rule #4-2, the UE compares the amount of P-CSI information which the UE may transmit (together with the HARQ ACK information) before applying the HARQ ACK bundling and the amount of P-CSI information which the UE may transmit (together with the HARQ ACK information) after applying the HARQ ACK bundling and when the P-CSI information which the UE may transmit after applying the HARQ ACK bundling is the larger, the UE may perform the HARQ ACK bundling.

(Rule #4-3) The rule may be defined so that when the HARQ ACK bundling is performed for another purpose (e.g., a purpose of COVERAGE EXTENSION and a purpose for adjusting 'MAXIMUM INPUT (INFORMATION) BIT SIZE' in a CHANNEL CODING application step) other than a simultaneous transmission purpose of the HARQ-ACK information and the (multiple) P-CSI information, simultaneous transmission of the (multiple) P-CSI information is omitted (that is, only transmission of (bundled) HARQ-ACK information is performed).

Herein, as another example, the rule may be defined so that (some or all) P-CSI report(s)-related P-CSI information(s) (or a pre-defined (or signaled) number of P-CSI report(s) related P-CSI information(s) or a predefined (or signaled) bit number of P-CSI information(s)) to be transmitted at the corresponding time is additionally simultaneously transmitted according to the number of remaining bits excluding the number of bundled HARQ-ACK (information) bits (and/or the remaining bit(s) exist(s)) among the maximum number of (information) bits which may be transmitted through the PF (e.g., MP_PF).

(Rule #4-4) The rule may be defined so that (when Rule #4-1) and/or (Rule #4-2) and/or (Rule #4-3) is applied) when K (e.g., 'K≥1') P-CSI report related P-CSI information having a relatively (highest) high priority (see, e.g., the priority described in (Rule #4-1)) may not be transmitted through the "number of remaining bits (REM_BIT)', a maximum of L P-CSI report(s)-related P-CSI information(s) having a second highest priority (subordinated priority) (that is, checking in a descending order of the priority), which meets a condition of "L (e.g., 'L≥1') P-CSI report(s) related P-CSI information amount (/size)≤REM_BIT" is transmitted together (simultaneously) with the HARQ-ACK information.

Herein, as an example, the 'number of remaining bits (REM_BIT)' indicates the number of remaining bits excluding the number of (non-bundled or bundled) HARQ-ACK (information) bits among the maximum number of (information) bits which may be transmitted through the PF (e.g., MP_PF).

Hereinafter, an embodiment considering both the method for selecting a PUCCH format (hereinafter, referred to as PF) (or 'FORMAT ADAPTION') according to a predetermined (/ signaled) condition and thereafter, transmitting the CSI report and the HARQ ACK to the selected PF based on the selected PF and the method for transmitting the CSI report and the HARQ ACK to the base station based on a predetermined (/ signaled) priority of the CSI and an HARQ-ACK (spatial or time) bundling application criterion will be described through drawings.

Figure 16:
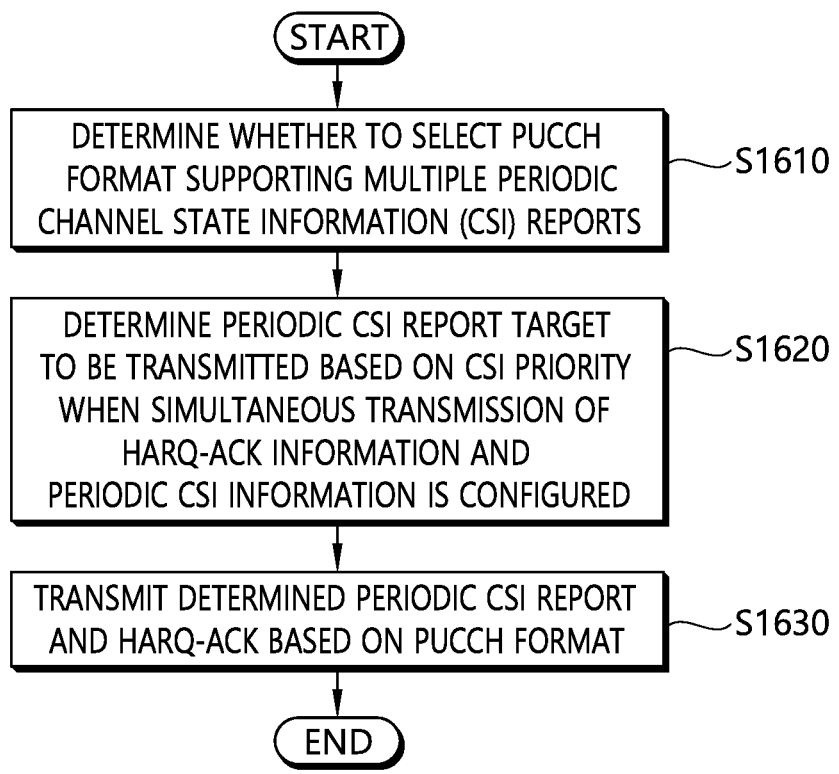
FIG. 16 is a flowchart of a method for selecting a PUCCH format according to yet another embodiment of the present invention.

FIG. 16 is a flowchart of a method for selecting a PUCCH format according to yet another embodiment of the present invention.

Referring to FIG. 16, the UE may determine whether to select a PUCCH format supporting multiple periodic CSI reports (S1610). In this case, detailed contents example in which the UE selects the PUCCH format is as described above.

Thereafter, when simultaneous transmission of the HARQ-ACK information and the periodic CSI information is configured, the UE may determine the periodic CSI report target to be transmitted based on the CSI priority (S1620). In this case, the detailed contents in which the UE determines the cyclic CSI report target to be transmitted based on the priority is as described above.

Thereafter, the UE may transmit the determined periodic CSI report and HARQ-ACK based on the PUCCH format (S1630). In this case, detailed contents in which the UE transmits the determined periodic CSI report and HARQ ACK is as described above.

The above-described embodiments of the present invention may be performed independently from or together with the following embodiments.

According to an example, a problem may occur, in which when the UE transmits the P-CSI related information (together with data) by PUSCH piggyback, the P-CSI related information is excessively piggybacked so that an area where the terminal may send data through the PUSCH is reduced. In this case, by using the maximum allowed P-CSI information size (/amount) (MAXALL_PCIBIT) and/or the maximum allowed P-CSI report number (MAXALL_APCI-NUM) which is preconfigured (/ signaled), it is possible to prevent data transmission performance of the UE from decreasing. More specifically,

[Proposal Method #5] When the P-CSI information(s) are piggybacked and transmitted to the PUSCH (together with DATA (UL-SCH)), the 'maximum allowed P-CSI information size (/amount) (MAXALL_PCIBIT)' (and/or the 'maximum allowed P-CSI report number (MAXALL_APCINUM)'') may be configured to be determined according to the following (some or all) rules.

Herein, as an example, the rule may be defined so that the UE is allowed to perform even an 'operation in which the multiple P-CSI information(s) are piggybacked to the PUSCH (together) when an 'operation in which the multiple P-CSI information(s) is(are) transmitted to the PUCCH' is configured.

(Rule #5-1) The size (/amount) (and/or the number of P-CSI reports) of P-CSI information which may be maximally (simultaneously) transmitted may be each designated as MAXALL_PCIBIT (and/or MAXALL_APCINUM) within a range (e.g., rate matching is applied to data information together (simultaneously) with the case where the P-CSI information is piggybacked to the PUSCH) which exceeds a predefined (or signaled) data transmission related 'coding rate threshold (DATACR_TH)'. Herein, as an example, the number of P-CSI reports (and/or the size (/amount) of P-CSI information) that may be transmitted maximally (simultaneously) may be determined by preferentially considering the P-CSI report(s) having a relatively high priority (see, e.g., the priority described in (Rule #4-1)). Herein, as an example, MAXALL_PCIBIT (and/or MAXALL_APCINUM) may be changed (dynamically) based on the SCHEDULED BANDWIDTH (or RESOURCE SIZE) related with the PUSCH transmission.

(Rule #5-2) The eNB may also notify MAXALL_PCIBIT (and/or MAXALL_APCINUM) related information to the UE communicated through a pre-defined signaling (e.g., higher layer signaling or physical layer signaling). Further, as an example, (some or all) MAXALL_PCIBIT (and/or MAXALL_APCINUM) information(s) related to CQI/PMI/RI may be signaled independently.

[Proposal Method #6] The rule may be defined so that when the P-CSI information(s) is transmitted via the PUCCH and/or PUSCH, the UE is allowed to mask information (/indicator) indicting which CELL INDEX (and/or CSI PROCESS INDEX (/ID) and/or CG INDEX and/or CSI SF SET) the (multiple) P-CSI report(s) performed by the UE are related with.

Herein, as an example, when the rule is applied, a 'MIS-UNDERSTANDING' problem (between the eNB and the UE) for reported P-CSI information size (/amount) and/or a combination thereof may be mitigated.

According to an example, when the UE transmits P-CSI reports related to a plurality of cells using only the PUCCH, the UE needs to use a PUCCH format of a large size. Therefore, the UE using the PUCCH format may experience a decrease in coverage. In order to solve the above problems, the present invention provides a method for transmitting the P-CSI report using a PUSCH (to be simultaneously scheduled/transmitted) as well as the PUCCH at the time of transmitting the P-CSI reports related to the plurality of cells.

More specifically,

[Proposal Method #7] The rule may be defined (the CODING RATE increase in PUSCH DATA may be mitigated) so that when the UE in which the simultaneous transmission of the PUCCH and the PUSCH is configured needs to perform multiple P-CSI report(s) for the plurality of cell(s) without HARQ-ACK feedback transmission at a specific time, some specific (e.g., predefined (or signaled) number of multiple P-CSI report(s) and/or predefined (or signaled) number of cell(s) (or CSI process(es)) related multiple P-CSI report(s) and/or multiple P-CSI report(s) which may be transmitted within a predetermined (or signaled) 'bit size threshold' are transmitted to the PUCCH and other specific some P-CSI report(s) are piggybacked and transmitted to the PUSCH.

Herein, as an example, the rule may be defined so that in selecting multiple P-CSI report(s) which are transmitted through the PUCCH, a (relatively high) priority is assigned to relatively low (or high) CELL INDEX (or CG INDEX or CSI PROCESS INDEX (/ID) related P-CSI report(s) (and/or P-CSI report(s) including a predefined (or signaled) UCI (e.g., RI, PMI, and CQI)).

Further, as an example, the rule may be defined (only the HARQ-ACK feedback may be transmitted through the PUCCH) so that multiple P-CSI report(s) are piggybacked and transmitted to the PUSCH in order to mitigate the increase in coding rate of the HARQ-ACK feedback transmitted to the PUCCH when the HARQ-ACK feedback transmission is performed at the corresponding specific time.

According to an example, provided is a method in which when PUCCH FORMAT #A (PF #A) and PF #B are configured for the transmission purposes of "PERIODIC CSI (P-CSI) ONLY" and "HARQ-ACK (/SR) ONLY", respectively and assuming that the (maximum payload) size of PF #A is larger than the (maximum payload) size of PF #B, transmission of the P-CSI information(s) and transmission of the HARQ-ACK (/SR) information are simultaneously performed, PF having a relatively larger size is used. Accordingly, when the transmission of the P-CSI information(s) and the transmission of the HARQ-ACK (/SR) information need be performed at the same time, the use of a relatively larger PF may reduce the degree of CSI reporting drop.

More specifically,

[Proposal Method #8] As an example, a situation is assumed, in which PUCCH FORMAT #A (PF #A) and PF #B are configured for the transmission purposes of "PERIODIC CSI (P-CSI) ONLY" and "HARQ-ACK (/SR) ONLY", respectively and the (maximum payload) size of PF #A is larger than the (maximum payload) size of PF #B. Under such a situation, the following (some or all) rules may be applied.

(Rule #8-1) When P-CSI information(s) transmission and HARQ-ACK (/SR) information(s) transmission overlap (in a time domain), both the P-CSI information(s) and the HARQ-ACK (/SR) information(s) may be configured to be continuously transmitted through PF #A.

(Rule #8-2) When P-CSI information(s) transmission and HARQ-ACK (/SR) information(s) transmission overlap (in the time domain), if the sum of the bit number of the P-CSI information(s) and the bit number of non-bundled AN/SR information(s) exceeds the (maximum payload) size of PF #B, both the P-CSI information(s) and the HARQ-ACK (/SR) information(s) may be configured to be transmitted through PF #A.

Otherwise, for example, the sum of the bit number of the P-CSI information(s) and the bit number of non-bundled AN/SR information(s) is equal to or less than the (maximum payload) size of PF #B, both the P-CSI information(s) and the HARQ-ACK (/SR) information(s) may be configured to be transmitted through PF #B.

(Rule #8-3) When P-CSI information(s) transmission and HARQ-ACK (/SR) information(s) transmission overlap (in the time domain), if the sum of the bit number of the P-CSI information(s) and the bit number of bundled HARQ-ACK (/SR) information(s) exceeds the (maximum payload) size of PF #B, both the P-CSI information(s) and the HARQ-ACK (/SR) information(s) may be configured to be transmitted through PF #A.

Otherwise, for example, the sum of the bit number of the P-CSI information(s) and the bit number of bundled HARQ-ACK (/SR) information(s) is equal to or less than the (maximum payload) size of PF #B, both the P-CSI information(s) and the HARQ-ACK (/SR) information(s) may be configured to be transmitted through PF #B.

(Rule #8-4) When P-CSI information(s) transmission and HARQ-ACK (/SR) information(s) transmission overlap (in the time domain), if the sum of a minimum value (that is, MIN (N, M)) between the bit number (N) of P-CSI information(s) (which are required to be transmitted) and a predefined (or signaled) (maximum transmission allowed P-CSI information(s)) bit number and the bit number of non-bundled HARQ ACK (/SR) information(s) exceeds the (maximum payload) size of PF #B, both the P-CSI information(s) and the HARQ-ACK (/SR) information(s) may be configured to be transmitted through PF #A.

Otherwise, for example, the sum of MIN (N, M) and the bit number of non-bundled HARQ-ACK (/SR) information(s) is equal to or less than the (maximum payload) size of PF #B, both the P-CSI information(s) and the HARQ-ACK (/SR) information(s) may be configured to be transmitted through PF #B.

(Rule #8-5) When P-CSI information(s) transmission and HARQ-ACK (/SR) information(s) transmission overlap (in the time domain), if the sum of a minimum value (that is, MIN (N, M)) between the bit number (N) of P-CSI information(s) (which are required to be transmitted) and a predefined (or signaled) (maximum transmission allowed P-CSI information(s)) bit number and the bit number of bundled HARD-ACK (/SR) information(s) exceeds the (maximum payload) size of PF #B, both the P-CSI information(s) and the HARQ-ACK (/SR) information(s) may be configured to be transmitted through PF #A.

Otherwise, for example, the sum of MIN (N, M) and the bit number of bundled HARQ-ACK (/SR) information(s) is equal to or less than the (maximum payload) size of PF #B, both the P-CSI information(s) and the HARQ-ACK (/SR) information(s) may be configured to be transmitted through PF #B.

[Proposal Method #9] As an example, the total UCI (payload) size is the same even if UCI combinations (/CONTENTS) transmitted by the UE are different (at different time). In this case, (in order to lower 'BLIND DETECTION COMPLEXITY' related with UCI reception of the base station), the UE may be configured to perform '(PUCCH(/PUSCH)) CRC MASKING' of information (/indicator) indicating which (CELL (/CELL GROUP) and/or CSI PROCESS related) UCI combination (/CONTENTS) the UE transmits and transmits the corresponding UCI combination (/contents).

Herein, as an example, when the HARQ-ACK (/SR) information (bit) is included in the UCI combination (/contents) transmitted by the UE, '(bit) 1' may be subjected to '(PUCCH(/PUSCH)) CRC MASKING', while the HARQ-ACK (/SR) information (bit) is not included in the UCI combination (/contents), '(bit) 0' (and/or when both the P-CSI information (bit) and the HARQ-ACK (/SR) information (bit) are transmitted, '(bit) 1' may be subjected to '(PUCCH(/PUSCH)) CRC MASKING', while when both the P-CSI information (bit) and the HARQ-ACK (/SR) information (bit) are transmitted, '(bit) 0' may be subjected to '(PUCCH(/PUSCH)) CRC MASKING').

[Proposal Method #10] The rule may be defined so that when (multiple) P-CSI information(s) are piggybacked and transmitted through the PUSCH, a plurality of P-CSIs corresponding to a (predefined (or signaled))specific PUCCH REPORTING TYPE is jointly coded (e.g., 'joint coding'). As an example, in the case of the P-CSI, serving cells corresponding to RI information and CQI/PMI information which are simultaneously transmitted may be different. Therefore, the (bit) sizes of the RI information and the CQI/PMI information are independent of each other and it may be considered that the RI information and the CQI/PMI information are subjected to 'joint coding'.

[Proposal Method #11] "Multiple P-CSI(S) (+A/N) ON PUCCH" and "multiple P-CSI(S) (+A/N) ON PUSCH" may be 'separately configured'. More specifically, the number of P-CSI reports which may be piggybacked to one PUSCH or the number of feedback bits may be configured from the base station or whether only a single P-CSI report or a plurality of P-CSI reports is allowed to be piggybacked to one PUSCH may be configured from the base station.

Herein, as an example, in such an operation (e.g., allowing piggyback of a plurality of P-CSI reports to one PUSCH), when a larger number of cell(s) than a predefined (or signaled) threshold is configured as CA, (e.g.,) the corresponding threshold may be set to '5' (or '8') (and/or cell(s) configured as a predefined (or signaled) specific TDD UL-DL CONFIGURATION (e.g.,) TDD UL-DL CONFIGURATION #5) may be excluded) and/or when the total bit size (or the total number of (P-)CSI report(s) or the total number of (P-CSI report(s) related) CSI PROCESS(S) of (P-)CSI report(s) which is configured in one UE or where the reporting time overlaps (or which is simultaneously reported) is larger than a predefined (or signaled) threshold (e.g.,) the corresponding threshold may be limitedly applied (/available) only to '11 bits (or 13 bits) or 55 bits or 88 bits (based on the existing PF2)' (set to '1 or 5 or 8 P-CSI reports' or '1 or 5 or 8 (P-CSI report related) CSI processes').

It is obvious that since the examples of the proposed method described above may also be included as one of implementing methods of the present invention, the examples may be regarded as a kind of proposed methods. Further, the proposed methods described above may be independently implemented, but implemented in combination (or merge) of some of the proposed methods. In addition, the rule may be defined so that the above-described proposal methods are limitedly applied only to a case where a larger number of cell(s) than a predefined (or signaled) threshold (e.g., 5 or 8) are configured as CA (and/or a case where 'MASSIVE CA MODE' is configured).

Figure 17:
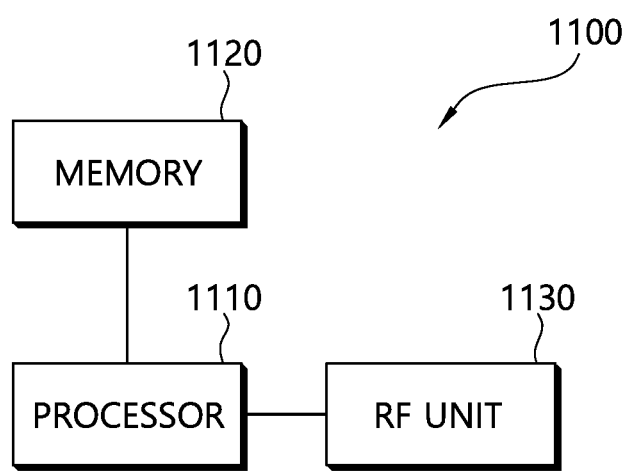
FIG. 17 is a block diagram illustrating a UE in which embodiment of the present invention is implemented.

FIG. 17 is a block diagram illustrating a UE in which the embodiment of the present invention is implemented.

Referring to FIG. 17, the UE 1100 includes a processor 1110, a memory 1120, and a radio frequency (RF) unit 1130. The processor 1110 implements a function, a process, and/or a method which are proposed. Referring to FIG. 1110, the UE may determine whether to select a PUCCH format supporting multiple periodic CSI reports (S1610). The processor 1110 may transmit the periodic CSI report and the HARQ-ACK based on the PUCCH format.

The RF unit 1130 is connected with the processor 1110 to transmit and receive a radio signal.

The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

What is claimed is:

1. A method for transmitting periodic channel state information (CSI) reporting in a wireless communication system, the method performed by a user equipment (UE) and comprising:
   selecting a first physical uplink control channel (PUCCH) format; and
   transmitting multiple periodic CSI reports and a hybrid automatic repeat request (HARQ) ACK based on the first PUCCH format,
   wherein the first PUCCH format is a PUCCH format supporting the multiple periodic CSI reports,
   wherein when a number of cells, greater than a predetermined threshold, are configured for the UE by carrier aggregation, the first PUCCH format is selected, and
   wherein a cell index of each of the multiple periodic CSI reports is included in a cyclic redundancy check (CRC).

2. The method of claim 1, wherein when a bit size of the multiple periodic CSI reports is larger than a predetermined threshold, the first PUCCH format is selected.

3. The method of claim 1, wherein when a HARQ ACK fallback occurs, the UE selects the first PUCCH format.

4. The method of claim 3, wherein when the bit size of the multiple periodic CSI reports is larger than the predetermined threshold, the first PUCCH format is selected.

5. The method of claim 1, further comprising:
   determining a periodic CSI report target to be transmitted based on a CSI priority,
   wherein the periodic CSI report and a HARQ ACK determined based on the first PUCCH format are transmitted, and
   wherein the periodic CSI report target comprises periodic CSI reports to be transmitted among multiple CSI reports.

6. A method for transmitting periodic channel state information (CSI) in a wireless communication system, the method performed by a user equipment (UE) and comprising:
   when both a hybrid automatic repeat request (HARQ) ACK and a periodic CSI report are configured to be transmitted, selecting a periodic CSI report target to be transmitted based on a CSI priority, when a physical uplink control channel (PUCCH) resource of a primary cell of the UE is less than a resource for transmission of the periodic CSI report; and
   transmitting the selected periodic CSI report target and the HARQ ACK,
   wherein when a number of selected periodic CSI report target, which may be reported together with the HARQ ACK after bundling, is larger than the number of the selected periodic CSI reports, which may be reported together with the HARQ ACK before bundling, the bundling is applied to the HARQ ACK, and
   wherein the periodic CSI report target comprises periodic CSI reports to be transmitted among multiple CSI reports.

7. The method of claim 6, wherein the CSI priority is determined based on at least one of a cell group index, a periodic CSI report type, a CSI process index, a cell index, or a CSI subframe set index.

8. The method of claim 7, wherein the CSI priority is determined in an order of the cell group index, the periodic CSI report type, the CSI process index, the cell index, and the CSI subframe set index.

9. The method of claim 7, wherein when transmitting the selected periodic CSI report and the HARQ ACK based on the at least one of the cell group index, the periodic CSI report type, the CSI process index, the cell index, or the CSI subframe set index, information for the at least one of the cell group index, the periodic CSI report type, the CSI process index, the cell index, or the CSI subframe set index is included in a cyclic redundancy check (CRC).

10. A user equipment (UE) comprising:
    a transmitter and receiver; and
    a processor, operatively coupled to the transmitter and receiver,
    wherein the processor is configured to:
    select a first physical uplink control channel (PUCCH) format, and
    control the transmitter to transmit multiple periodic CSI reports and a hybrid automatic repeat request (HARQ) ACK based on the first PUCCH format,
    wherein the first PUCCH format is a PUCCH format supporting the multiple periodic CSI reports, which are periodic CSI reports of a plurality of cells,
    wherein when a number of cells, greater than a predetermined threshold, are configured in the UE by the carrier aggregation, the first PUCCH format is selected, and
    wherein a cell index of each of the multiple periodic CSI reports is included in a cyclic redundancy check (CRC).

* * * * *